(12) United States Patent
Lee et al.

(10) Patent No.: US 12,449,584 B2
(45) Date of Patent: Oct. 21, 2025

(54) DOOR ASSEMBLY, AND REFRIGERATOR AND HOME APPLIANCE INCLUDING SAME

(71) Applicant: LG Electronics Inc., Seoul (KR)

(72) Inventors: Bum Sang Lee, Seoul (KR); Kyoung Joung Kim, Seoul (KR); Misun Park, Seoul (KR); Chul Bae Lee, Seoul (KR); Hophil Lee, Seoul (KR); Kiwan Nahm, Seoul (KR)

(73) Assignee: LG Electronics Inc., Seoul (KR)

( * ) Notice: Subject to any disclaimer, the term of this patent is extended or adjusted under 35 U.S.C. 154(b) by 36 days.

(21) Appl. No.: 17/870,061

(22) Filed: Jul. 21, 2022

(65) Prior Publication Data

US 2023/0035409 A1 Feb. 2, 2023

(30) Foreign Application Priority Data

Jul. 21, 2021 (KR) .......................... 10-2021-0095403
Jul. 21, 2021 (KR) .......................... 10-2021-0095404
Sep. 16, 2021 (KR) .......................... 10-2021-0124236

(51) Int. Cl.
*F21V 8/00* (2006.01)
*F21W 131/305* (2006.01)
*F25D 27/00* (2006.01)

(52) U.S. Cl.
CPC ........... *G02B 6/0051* (2013.01); *F25D 27/00* (2013.01); *G02B 6/0025* (2013.01); *G02B 6/0088* (2013.01); *F21W 2131/305* (2013.01)

(58) Field of Classification Search
CPC ..... G02B 6/0025; G02B 6/0051; F25D 27/00; F21W 2131/305; G02F 1/133331; G02F 1/133317; G02F 1/13332; G09F 2013/1881; G09F 2013/1872; G09F 2013/1877; G09F 2013/1836; G09F 2013/1854; G09F 13/019
See application file for complete search history.

(56) References Cited

U.S. PATENT DOCUMENTS 10,285,513 B2    5/2019  Lee
2010/0157199 A1*  6/2010  Kim .................... G02B 6/0088
                                              349/64

(Continued)

FOREIGN PATENT DOCUMENTS

WO    WO2018178595    10/2018

OTHER PUBLICATIONS

Extended European Search Report in European Appln. No. 22186295.6, dated Dec. 8, 2022, 8 pages.

*Primary Examiner* — Jong-Suk (James) Lee
*Assistant Examiner* — James M Endo
(74) *Attorney, Agent, or Firm* — Fish & Richardson P.C.

(57) ABSTRACT

A door assembly is used for a refrigerator and a home appliance. The door assembly includes a door body, and a lighting panel coupled to a front surface of the door body. The lighting panel includes a panel frame with a coupling space, and a lighting device is installed to the panel frame. A light guide panel is arranged in the coupling space. A front panel is arranged on a front surface of the lighting panel in parallel to the light guide panel. A diffusion panel is arranged between the front panel and the light guide panel. Therefore, a user can change a color of a door surface by the lighting device without replacing a door panel, and the diffusion panel diffuses light once to make the light uniform.

19 Claims, 39 Drawing Sheets

(56) References Cited

U.S. PATENT DOCUMENTS

| | | | |
|---|---|---|---|
| 2010/0295425 A1 | 11/2010 | Kim | |
| 2010/0319383 A1 | 12/2010 | Kim | |
| 2011/0079034 A1 | 4/2011 | Kim et al. | |
| 2013/0044269 A1* | 2/2013 | Cho | G02F 1/133615 349/58 |
| 2013/0063681 A1* | 3/2013 | Zhou | G02B 6/0088 362/606 |
| 2013/0094246 A1* | 4/2013 | Kim | G09F 9/35 362/613 |
| 2015/0009712 A1* | 1/2015 | Hwang | G02B 6/0025 362/611 |
| 2015/0078032 A1* | 3/2015 | Horiguchi | G02B 6/005 362/606 |
| 2015/0198756 A1* | 7/2015 | Song | G02F 1/133504 362/609 |
| 2015/0234116 A1* | 8/2015 | Azuma | G02F 1/133608 362/97.1 |
| 2016/0291231 A1* | 10/2016 | Jang | G09G 3/3406 |
| 2017/0123138 A1* | 5/2017 | Sasaki | G02B 6/0088 |
| 2017/0176835 A1* | 6/2017 | Gupta | G02B 6/0023 |
| 2018/0106961 A1* | 4/2018 | Hwang | G02B 6/0091 |
| 2018/0160824 A1* | 6/2018 | Lee | F25D 11/00 |
| 2018/0172894 A1* | 6/2018 | Sohn | G02B 6/0088 |
| 2019/0257571 A1 | 8/2019 | Park et al. | |
| 2019/0360745 A1 | 11/2019 | Lee et al. | |
| 2020/0050046 A1* | 2/2020 | Park | G02F 1/133606 |
| 2022/0026052 A1* | 1/2022 | Keller | G02B 6/0095 |

\* cited by examiner

DOOR ASSEMBLY, AND REFRIGERATOR AND HOME APPLIANCE INCLUDING SAME

CROSS-REFERENCE TO RELATED APPLICATIONS

This application claims the priority benefit of Korean Patent Application No. 10-2021-0095403, filed on Jul. 21, 2021, Korean Patent Application No. 10-2021-0095404, filed on Jul. 21, 2021, and Korean Patent Application No. 10-2021-0124236, filed on Sep. 16, 2021. The disclosures of the prior applications are incorporated by reference in their entirety.

BACKGROUND OF THE INVENTION

Field of the Invention

The present disclosure relates to a door assembly and, more particular, to a door assembly of which a front surface includes a lighting panel, and a refrigerator and a home appliance including the same.

Description of the Related Art

In general, a refrigerator is a home appliance that can store food at a low temperature in an internal storage space that is shielded by a door. For the purpose, the refrigerator is configured to cool the inside of the storage space by using cold air generated through heat exchange with a refrigerant circulating in a freezing cycle to store the stored food in the optimal state.

Recently, refrigerators are gradually becoming multifunctional according to changes in dietary habits and the trend of luxury products, and refrigerators having various structures and convenience devices to increase user convenience and allow efficient use of internal space have been released.

Specifically, as consumers' interest in the design of home appliances such as refrigerators increases, various products that can change the appearance of home appliances to suit users' preference are being developed. For example, in order to harmonize with the installation environment of the refrigerator or the surrounding furniture/home appliances, structures that vary the exterior of the refrigerator door are being developed.

U.S. Pat. No. 8,789,900 (Related Document 1) and Korean Patent Application Publication No. 10-2005-0007108 (Related Document 2) disclose a structure in which a cover panel forming the exterior of a refrigerator is mounted to a front surface of a refrigerator door, and the cover panel is removably provided so that the exterior of the refrigerator door suitable for users' preference.

However, in the refrigerator with the structure, when the user wants to change the exterior, the entire decorative panel must be removed and replaced, and it is very inconvenient to replace the decorative panel, and the number of parts for separation and installation is large, production cost increases and ease of assembly is poor. Furthermore, since the decorative panel can only be replaced with a predetermined panel, the range of design choices is narrow.

Chinese Patent No. 103250018 (Related Document 3) discloses a refrigerator of which a door front surface include a reflection layer and a transparent panel, and colored light emitting members are mounted to opposite ends of the reflection layer so that the transparent panel can be illuminated with a preset color, and Korean Patent Application Publication No. 10-2019-0003446 (Related Document 4) discloses an edge-type LED lighting device in which a light emitting part (LED module) emits light to a side surface of a transparent panel (light-transmitting panel).

However, the transparent panel has a method in which a light emitting part arranged at any one or opposite portions of the transparent panel transmits light throughout the entire transparent panel, so that it is difficult to uniformly illuminate the entire region of the transparent panel. Specifically, some regions of the transparent panel close to the light emitting part are relatively bright, but the brightness is reduced at regions far from the light emitting part to deteriorate overall aesthetics.

Then, the light emitting part (LED module) is mounted to a bracket, and a relatively dark region may be generated along an edge portion of the door with the bracket. Therefore, it is difficult to make overall brightness and color of the transparent panel uniform.

As described above, a section to which light is not uniformly transmitted exists in the entire area of the door, so that there is a problem of not providing a unified aesthetic feeling to users. Of course, it is possible to prevent shading by placing the light emitting part outside the transparent panel, but there is a problem that the entire size of the door increases.

Furthermore, the bracket provided inside the transparent panel is easily exposed to the user through the transparent panel, so that the aesthetics of the door is reduced.

Meanwhile, Korean Patent No. 10-1667630 (Related Document 5) discloses a technique of a liquid crystal display device that uses an optical sheet to evenly diffuse light of the light emitting part to a liquid crystal panel. However, in the related document 5, a frame structure surrounding an edge of the liquid crystal panel exists, and the frame structure becomes a portion to which the light is not incident. Therefore, the entire region of the door front surface is not illuminated and there is also a limit to improve the aesthetics of the door.

Furthermore, the door is provided on a refrigerator, etc., and is repeatedly opened and closed and shaking and vibration are generated in the process. There is a problem in that parts such as the transparent panel, etc. included in the door are twisted or separated from an installation position due to the shaking and vibration, and thus the durability of the door is deteriorated.

Specifically, the related document 5 relates to the liquid crystal display device to which the heavy liquid crystal panel is applied, which is provided for display devices such as TVs used in a fixed state, and when the liquid crystal display device is applied to a door of a refrigerator, the liquid crystal display device is inevitably more week to shaking and vibrations that occur during door operation.

Documents of Related Art (Related Document 1) U.S. Pat. No. 8,789,900
(Related Document 2) Korean Patent Application Publication No. 10-2005-0007108
(Related Document 3) Chinese Patent No. 103250018
(Related Document 4) Korean Patent Application Publication No. 10-2019-0003446
(Related Document 5) Korean Patent No. 10-1667630

SUMMARY OF THE INVENTION

The present disclosure has been provided to solve the above problems occurring in the related art, and an objective of the present is to use a lighting device without replacing a door panel to change a color of a front surface of the door.

Another objective of the present disclosure is to uniformly illuminate the entire region of a door through a diffusion panel.

A further objective of the present disclosure is to allow a panel frame surrounding a lighting device to transmit light, thereby preventing shading due to the panel frame, and reducing exposure of the panel frame.

A further objective of the present disclosure is to fix a front panel (glass) to a panel frame through a diffusion panel without being directly fixed to the panel frame, so that an edge surface of the front panel is exposed to the outside space.

A further objective of the present disclosure is to allow a front panel (glass) and parts such as a panel frame arranged behind the front panel to be in close contact with each other sequentially to reduce a gap between the panel frame and the front panel.

In order to achieve the above objectives, according to one aspect of the present invention, the present disclosure may include a door body, and a lighting panel coupled to a front surface of the door body. The front panel may be arranged on a front surface of the lighting panel in parallel to the light guide panel transmitting light of a light source. Herein, a diffusion panel may be arranged between the front panel and the light guide panel, and the diffusion panel may be in close contact with a rear surface of the front panel. Therefore, a user may change a color on a front surface of the door by using a lighting device, and the diffusion panel may diffuse light of the light guide panel once to make the light of the front panel uniform.

Then, one end of the diffusion panel located in front of the lighting device may be formed longer than one end of the front panel. The diffusion panel may be formed longer than the front panel, so that a hot spot generated due to a light source may be efficiently diffused.

Furthermore, a front surface portion of the panel frame surrounding an edge portion of the light guide panel may be arranged between the diffusion panel and the light guide panel, and the front surface portion of the panel frame may be in close contact with both the diffusion panel and the light guide panel. Specifically, the front panel, the diffusion panel, the front surface portion of the panel frame, and the light guide panel may be in close contact with each other sequentially. In this state, even when the door may be repeatedly opened or closed, it is possible to prevent the parts from being twisted or escaping and light of the light source may be uniformly diffused.

Then, the panel frame may be made of a transparent or translucent material. Therefore, the panel frame may transmit the light of the light source directly, so that the panel frame may prevent the front panel from being shaded.

Then, the diffusion end may be arranged closer to the center of the lighting panel than the edge surface of the front panel. Therefore, shading generated on an end of the panel frame may be diffused to a location far from the edge surface of the front panel.

Furthermore, the panel frame may surround an edge of the light guide panel, and the front panel may be arranged at a front surface of the panel frame. In other words, the diffusion panel may be directly attached to the panel frame.

Then, a front surface of the diffusion panel may be attached to the rear surface of the front panel, and a rear surface of the diffusion panel may be attached to the panel frame. Accordingly, the panel frame does not block the edge surfaces of the front panel, and the front panel does not need to include an attaching portion to be attached to the panel frame, and thus the attaching portion may prevent the front panel from being shaded.

Then, an edge surface of the light guide panel may be in close contact with the light source. When the light guide panel is in close contact with the light source, the light of the light source may be directly transmitted to the light guide panel without light passing through an empty space, and loss of light can be reduced, and alignment may be improved.

The diffusion plate may protrude more than the lighting guide panel in a direction of increasing the area of the lighting panel. Accordingly, the diffusion panel may uniformly transmit light to the front panel.

The front panel and the light guide panel may be spaced apart from each other and a diffusion space may be provided between the front panel and the light guide panel. The diffusion space may diffuse light of the light guide panel transmitted to the diffusion panel.

Furthermore, the diffusion end with a curved shape or an inclined shape may be formed on an edge of the panel frame facing the rear surface of the diffusion panel. A diffusion end may be formed on the edge of the panel frame instead of an angled corner, so that a dark boundary portion generated when light does not reach the edge of the panel frame may be prevented.

Then, the area of the front panel may be less than the area of the diffusion panel and may be greater than the area of the light guide panel. Accordingly, even when the area of the light guide panel is formed small, the light widely diffused by the diffusion panel may be uniformly transmitted to the entire area of the front panel.

Furthermore, the lighting device may include a substrate extended along an edge of the light guide panel, ad a plurality of light sources arranged on the substrate to face the light guide panel.

Then, a front surface and a rear surface of the front panel may consist of flat surfaces, and a round portion may be formed on the edge surface of the front panel. Herein, a boundary point between the flat portion and the round portion may be located equal to or higher than an upper surface of the light source of the lighting device. As described above, the hot spot due to the light of the light source may be reduced or prevented from being generated at the lower portion of the front panel.

Furthermore, the boundary point between the flat portion and the round portion may be located within a range between upward 5 degrees and downward 5 degrees from the upper surface of the light source of the lighting device.

A frame cover may be coupled to a lower portion of the panel frame, the lower portion surrounding the lighting device, and the frame cover may support an edge surface of the front panel. The frame cover may block a lower structure of the lighting panel, and support the front panel from the lower portion thereof.

The frame cover may include a shield end protruding toward the edge surface of the front panel, and the front panel may protrude forward than the shield end. Accordingly, an area where the frame cover is shown in the user's sight, and the esthetics of the door may be increased.

Furthermore, the panel frame may include a lower frame supporting a lower portion of the light guide panel, and an upper frame supporting a upper portion of the light guide panel, and side frames respectively supporting opposite surfaces of the light guide panel, and the side frames may include a pair of side frames connecting the lower frame to the upper frame.

Then, edges of the light guide panel may be fitted into mounting grooves formed pm the lower frame, the upper frame, and the pair of side frames.

The lighting device may be arranged in the lower frame, and a frame cover may cover a lower portion of the lower frame. Therefore, the lower frame may provide an installation space of the lighting device, and may be covered by the frame cover.

Then, a shield end of the frame cover may support the lower end of the front panel from the lower side thereof, and the shield end may cover an edge of the front surface of the diffusion panel.

Furthermore, the height of the shield end protruding toward the lower end of the front panel may be equal to or higher than the height of the lighting device o̲l̲ the light source. Accordingly, the hot spot exposed by t̲h̲e user the light source may be prevented.

Then, the lighting device may be arranged in the lower frame and the upper frame and a pair of frame covers may surround the lower frame and the upper frame. As described above, the lighting device may be arranged in a pair of portion, and the front panel may uniformly emit.

Furthermore, the panel frame may include a front surface portion located between a front surface of the light guide panel and the rear surface of the front panel, a rear surface portion spaced apart from the front surface portion and supporting a rear surface of the light guide panel, and a connection portion connecting the front surface portion to the rear surface portion, and the connection portion may surround an edge of the light guide panel.

Then, the rear surface portion may protrude further than the front surface portion in a direction toward the center of the lighting panel. Accordingly, the rear surface portion may be stably coupled to the back cover.

As described above, the door assembly according to the present disclosure, and the refrigerator and the home appliance including the same have effects as follows.

In the present disclosure, the lighting panel is arranged at the front surface of the door assembly, and the lighting panel may be illuminated by the embedded lighting device. The user can change a color on the front surface of the door by using the lighting device without a door panel, so that the esthetics of the door can be improved and use convenience can be improved. Specifically, as the lighting device is controlled, the color and brightness of the lighting panel can be controlled, and the range of door design choices can be widened.

Then, in the present disclosure, the diffusion panel is arranged between the front panel forming the front surface of the lighting panel and the light guide panel helping light transmission of the light source. The diffusion panel may diffuse light of the light guide panel once to make the light uniform, so that the entire region of the door can be illuminated more uniformly. Accordingly, the esthetics of the door front surface can be improved.

Specifically, in the present disclosure, the front panel is not directly fixed to the panel frame, and the diffusion panel in close contact with the rear surface of the front panel can be fixed to the panel frame. Accordingly, the panel frame does not block the edge surfaces of the front panel, and the front panel does not need to include an attaching portion to be attached to the panel frame, and thus the attaching portion can prevent the front panel from being shaded.

Then, in the present disclosure, the front panel constituting the lighting panel, and the diffusion panel, the door frame, the diffusion strip, and the light guide panel that are arranged behind the front panel are in close contact with each other sequentially. When, the parts are in close contact with each other without gaps, even when the door is repeatedly opened and closed, it is possible to prevent the parts such as the light guide panel from being twisted or escaping. Therefore, the light of the light source can be uniformly diffused, and the durability of the door can be improved.

Specifically, in the present disclosure, the diffusion panel arranged behind the front panel may be formed longer than the front panel, and thus the diffusion panel may diffuse the light of the light source on the entire front panel more uniformly, and the diffusion panel may stably support the front panel, so that the durability of the door can be improved.

Furthermore, according to the present disclosure, the panel frame (lighting bracket) surrounding the lighting device may be a transmission medium that may transmit light. Since the panel frame may directly transmit the light of the light source, it is possible to prevent shading occurring in the front panel due to the panel frame, and a region of the front panel close to the lighting device can have uniform luminance.

Specifically, the diffusion end having a curved surface shape may be formed on the edge of the panel frame rather than an angled corner. The curved diffusion end may prevent the edge of the panel frame from having the boundary portion that is dark as the light does not reach and may uniformly diffuse the light, and thus the entire front panel may be uniformly illuminated.

Then, in the present disclosure, among the edge surfaces of the glass front panel, remaining portions excluding the lower edge located in front of the lighting device may not be surrounded by a separate cover, so that a bezel region can be minimized. Therefore, the esthetics of the door can be improved by increasing the ratio of the area that the front panel occupies in the front surface of the door. Specifically, in the present disclosure, the diffusion panel may not be fixed to a separate frame and may be fixed in close contact with the panel frame surrounding the lighting device, so that the esthetics of the door can be improved by reducing the frame structure.

Furthermore, the diffusion panel may be made of a translucent material and may serve to block the parts such as the lighting device arranged behind the diffusion panel. The parts embedded in the lighting panel may not be observed from the front side of the door, so that the design of the door can be refined.

Specifically, the diffusion panel may block the parts arranged behind thereof, so that there is no need for performing an excessive processing such as printing on the glass front panel to block the parts. Therefore, there is an advantage in that the workability of the front panel is also improved.

Then, frames of the panel frame, which constitute four edges thereof, of the present disclosure may be made of a synthetic resin material, and the frames are coupled to each other to form one panel frame. Therefore, the panel frame can be made lighter, and even when the lighting device is installed, it is possible to make the door assembly not to be excessively heavy.

Specifically, since the panel frame is made of a synthetic resin material, processing is easy, and there is an advantage that a frame of a more complex shape can be implemented.

Furthermore, the parts constituting the lighting panel of the present disclosure may be assembled to each other without a separate coupling tool such as a screw, a bolt, or a rivet, so that the lighting panel can be made thin. Accordingly, it is possible to prevent thickness increasing of the door assembly and to sufficiently secure a filled space of an insulator, so that there is an advantage that the insulation performance can be maintained.

Then, in the present disclosure, the lighting device may be arranged closer to the center of the lighting panel than the edge surface of the front panel on the basis of a height direction. The edge surface of the front panel may be arranged outside the lighting device. Therefore, the entire region of the front panel can be uniformly illuminated, and it is possible to prevent the entire height of the lighting panel from being increased due to the lighting device, and the miniaturization of the lighting panel is possible.

Furthermore, in the present disclosure, the frame cover arranged behind the lower portion of the panel frame may support the lower portion of the front panel (glass), so that the front panel or the entire lighting panel can be prevented from being separated from the door by the weight of the front panel.

Specifically, even when the door assembly of the present disclosure is applied to products, such as refrigerators, Styler®, dish washers, etc., with doors that are repeatedly opened and closed, the frame cover connected to the door body may stably support the front panel, vibrations generated in the process of opening and closing the door can be reduced.

Furthermore, in the present disclosure, the edge surface of the light guide panel may be in close contact with the light source. When the light guide panel is in close contact with the light source, the light of the light source may be directly transmitted to the light guide panel without light passing through an empty space, so that loss of light can be reduced, and alignment can be improved without a gap between the parts, and the light guide panel can be maintained in the stably fixed state.

DETAILED DESCRIPTION OF THE INVENTION

Figure 1:
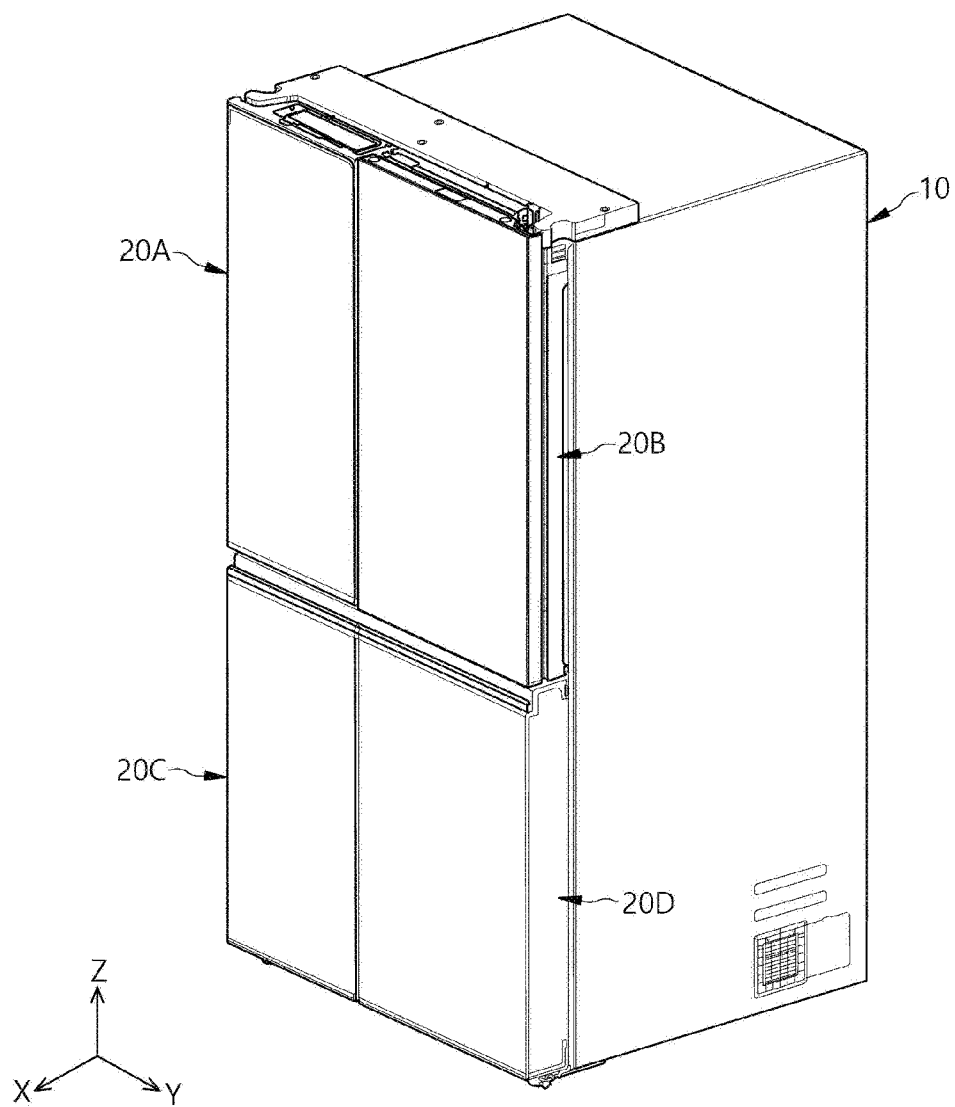
FIG. 1 is a perspective view showing a refrigerator using a door assembly according to an embodiment of the present disclosure.

Hereinbelow, some embodiments of the present disclosure will be described in detail with reference to illustrative drawings. In assigning reference numerals to components in each drawing, the same components are given the same reference numerals as much as possible even through the components are indicated in different drawings. Furthermore, in the following description, when it is decided that a detailed description of known configuration or function related to the present disclosure interferes with understanding of an embodiment of the present disclosure, the detailed description will be omitted.

A door assembly 20 according to the present disclosure may be used in home appliances, and may be used to open and close inner storage spaces of the home appliances. A front surface of the door assembly 20 may have various colors and different levels of brightness while being illuminated by a lighting device 130. The lighting device 130 may be embedded in the door assembly 20.

The door assembly 20 may be applied not only to doors of home appliances such as refrigerators, freezers, kimchi refrigerators, plant cultivators, Styler®, washing machines, etc., but also to doors of furniture, entrance doors, etc. Hereinbelow, the door assembly 20 according to the present disclosure applied to refrigerators will be described as an example.

In defining directions in the drawings before the description, the front side of the door assembly 20 may be a direction toward an user when the user looks the refrigerator from a front surface of the refrigerator, the rear side may be a direction opposite thereto (referring to X-axial direction in FIG. 1). The left side and the right side of the door assembly 20 may be a transverse width direction of the refrigerator (referring to Y-axial direction in FIG. 1), and the upper side and the lower side of the door assembly 20 may be a longitudinal direction of the refrigerator (referring to Z-axial direction in FIG. 1).

FIG. 1 is a view showing a refrigerator according to an embodiment of the present disclosure. The door assembly 20 may be provided at a cabinet 10 forming a frame of the refrigerator. The door assembly 20 may open and close a storage compartment of the cabinet 10, and in the embodiment, the door assembly 20 may include four door assemblies 20. More specifically, the door assembly 20 may include a first refrigerator door 20A and a second refrigerator door 20B which may open and close an upper refrigerating compartment, and a first freezer door 20C and a second freezer door 20D which may open and close a lower freezing compartment.

The first refrigerator door 20A, the second refrigerator door 20B, the first freezer door 20C, and the second freezer door 20D may be merely an example, and the number of the door assembly 20 and the arrangement thereof may be changed, and the door assemblies may have the same structure or respectively have different structures. Hereinbelow, it may be assumed that the four door assemblies 20A to 20D have the same structure, and the reference numeral 20 may be assigned to the four door assemblies.

Figure 2:
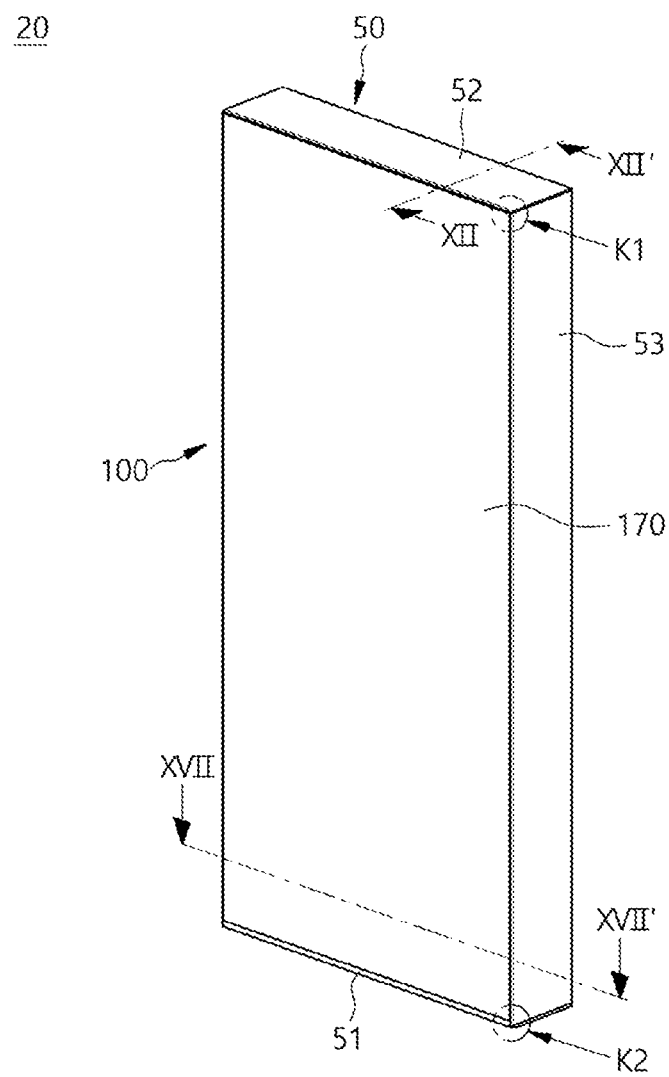
FIG. 2 is a perspective view showing a structure of the door assembly shown in FIG. 1.

FIG. 2 is a view showing the door assembly 20 according to the embodiment of the present disclosure. The door assembly 20 may have a hexahedral shape. The door assembly 20 may be rotatably coupled to the cabinet 10, or may be slidably coupled thereto. In order to rotatably couple the door assembly 20 to the cabinet 10, a hinge module may be coupled to the door assembly 20 but the hinge module is omitted in the drawings.

A handle may be provided on any one of the front surface or upper, lower, left, and right surfaces of the door assembly 20. Although not shown in the drawings, the handle may allow the user to grip, pull, and push the door assembly 20 more easily. Of course, the handle may be omitted, or a part of the door assembly 20 may be recessed to serve as a handle.

When showing the structure of the door assembly 20, the door assembly 20 may include a door body 50 and a lighting panel 100. The door body 50 may be a part that may form the frame of the door assembly 20, and serve to insulate the door assembly 20 while an insulator 80 (referring to FIG. 22) may be filled into the door body 50. The door body 50 may have a roughly hexahedral shape that may be longitudinally thin. In the embodiment, each of a lower plate 51, an upper plate 52, side plates 53, a rear plate 55, and a front plate 57 of the door body 50 may include a flat surface.

Figure 6:
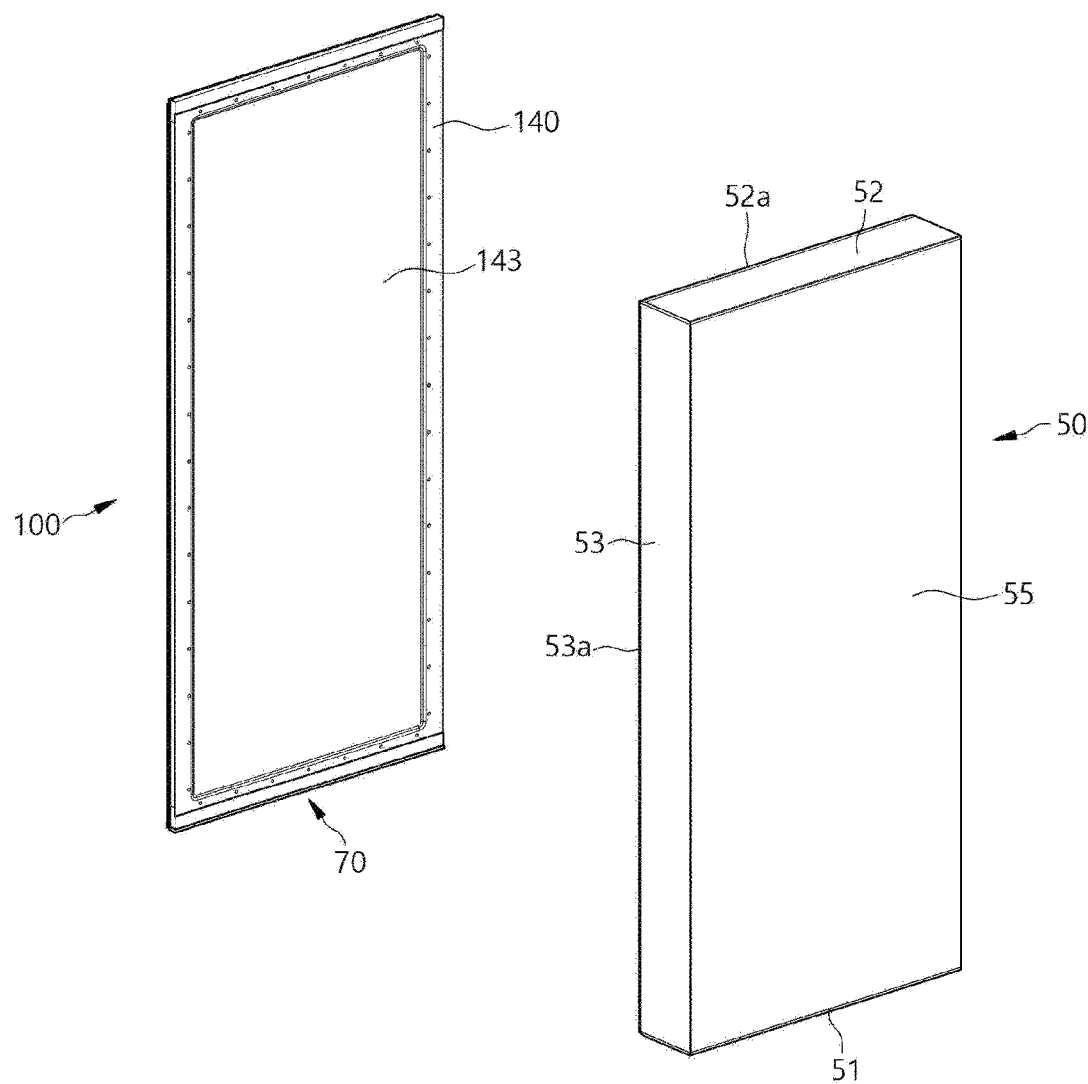
FIG. 6 is a perspective view showing the door body and the lighting panel in the separated state at a different angle from FIG. 5.

As shown in FIG. 6, a rear surface of the door body 50 may be also a flat surface, whereas a basket (not shown) may be mounted to the rear surface of the door body 50 that is a kind of a storage space. The rear surface of the door body 50 may include a door liner. The door liner may be made of a synthetic resin material, and may be formed such that the basket, etc. may be mounted to a rear surface of the door liner.

Then, a gasket (not shown) may be mounted to an edge of the door liner and the door assembly 20 may be closed, so that the gasket may be in contact with the cabinet 10 to prevent cool air in the storage space in the cabinet 10 from leaking. The door body 50 described above may have a general refrigerator door structure, and the door body 50 in the embodiment may be merely an example and various modifications are possible.

Figure 3:
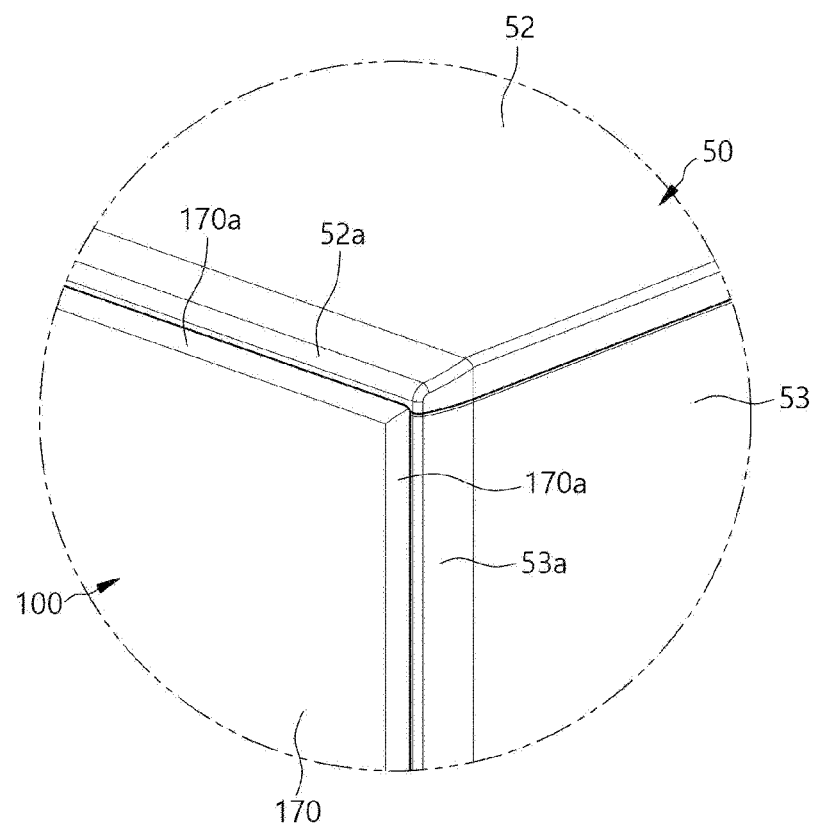
FIG. 3 is an enlarged-perspective view showing an upper corner of the door assembly shown in FIG. 2.

Referring to FIG. 3, an upper cover 52a may protrude on a front portion of the upper plate 52, and side covers 53a may protrude on front portions of the side plates 53. The upper cover 52a and the side covers 53a may protrude forward from the surfaces of the door body 50. The upper cover 52a may cover a part of an upper surface of the lighting panel 100, and the side covers 53a may cover a part of a side surface of the lighting panel 100.

Figure 18:
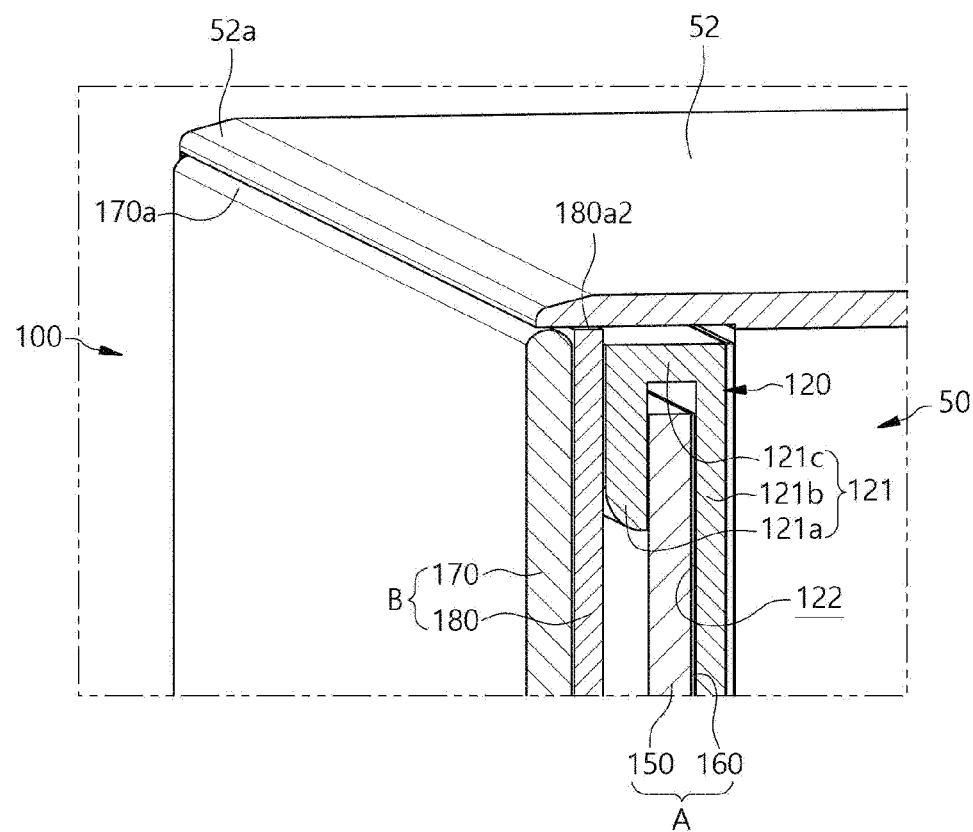
FIG. 18 is an enlarged-perspective view showing an upper portion of FIG. 17.

Herein, the upper cover 52a does not completely cover an edge surface 170a constituting an upper surface of a front panel 170, which will be described below, and may cover an upper portion of a diffusion panel 180 constituting the lighting panel 100, or cover the upper portion of the diffusion panel 180 and a part of the edge surface 170a of the front panel 170. Referring to FIGS. 3 and 18, a front end of the upper cover 52a does not completely cover the upper edge surface 170a of the front panel 170, and the front panel 170 protrudes farther forward than the upper cover 52a. For reference, in the description, the edge surface 170a may indicate an outer edge surface, which may be an edge surface located between a front surface and a rear surface of the front panel 170.

Figure 22:
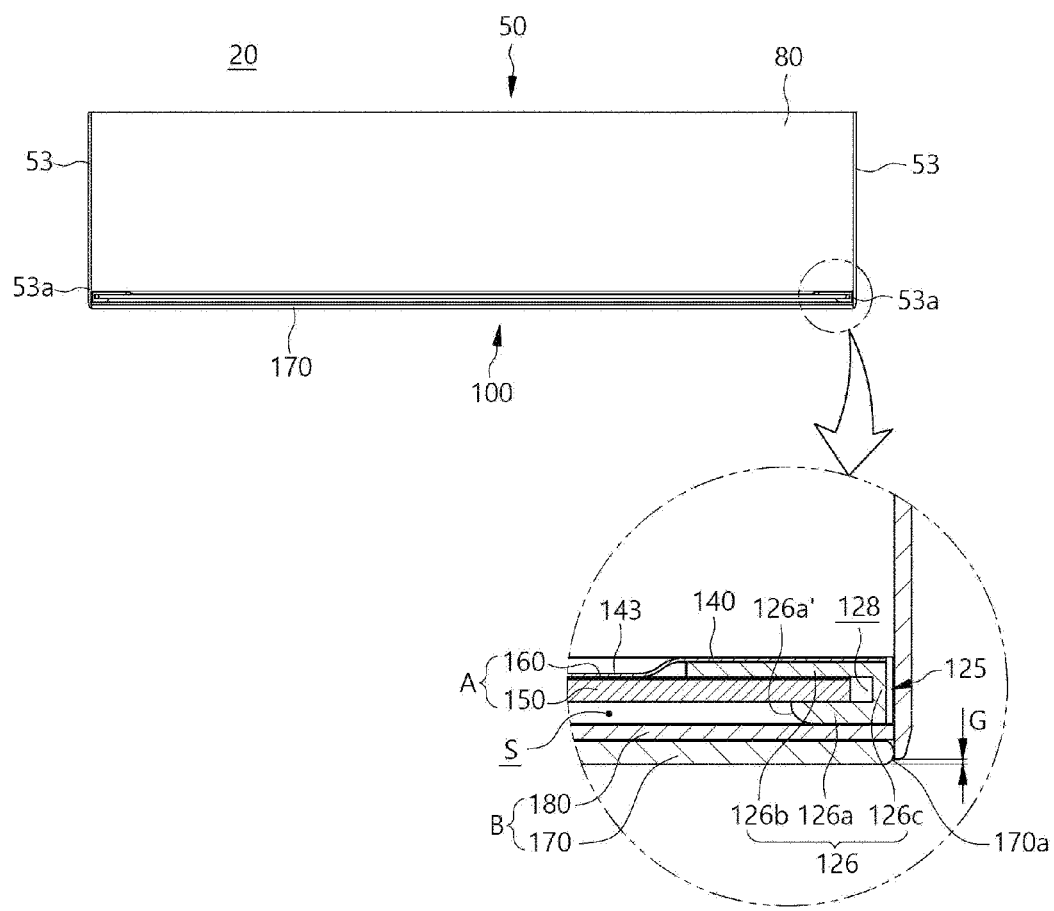
FIG. 22 is a sectional view taken along line XVII-XVII' in FIG. 2.

As shown in FIG. 3, each of the side covers 53a does not completely cover the edge surface 170a forming a side surface of the front panel 170. The side cover 53a may cover a side surface of the diffusion panel 180 constituting the lighting panel 100, or the side surface of the diffusion panel 180 and a part of the edge surface 170a of the front panel 170. Therefore, a portion of the front panel 170 exposed to the front side may increase, and most of a region observed by the user may be the front panel 170. As shown in FIG. 22, a right edge surface 170a of the front panel 170 may protrude farther forward (lower side based on the drawing) than the side cover 53a formed at a front portion of the side plate 53. Then, a predetermined gap G may be formed between the side cover 53a and the right edge surface 170a.

The rear plate 55 may be provided on the rear surface of the door body 50, and the front plate 57 may be provided on a front surface thereof. The rear plate 55 may face the cabinet 10, and the front plate 57 may be coupled to the lighting panel 100. The front plate 57 may have the area greater than or equal to the area of the lighting panel 100, and may have a rectangular plate shape equal to the shape of the lighting panel 100. The front plate 57 may have a flat plate structure, but have a structure of which a part is recessed.

Although not shown in the drawings, the front plate 57 may have a connection hole, and a wire harness and a connector may be mounted through the connection hole. The wire harness and the connector may serve to supply power and signals to the lighting device 130 of the lighting panel 100. In the embodiment, the lighting device 130 may be arranged at a lower portion of the lighting panel 100, and the connection hole and the wire harness and the connector mounted through the connection hole may be also arranged at a lower portion of the front plate 57. Otherwise, when the lighting device 130 is also arranged at an upper portion of the lighting panel 100, the connection hole may be formed in an upper portion of the front plate 57.

Figure 4:
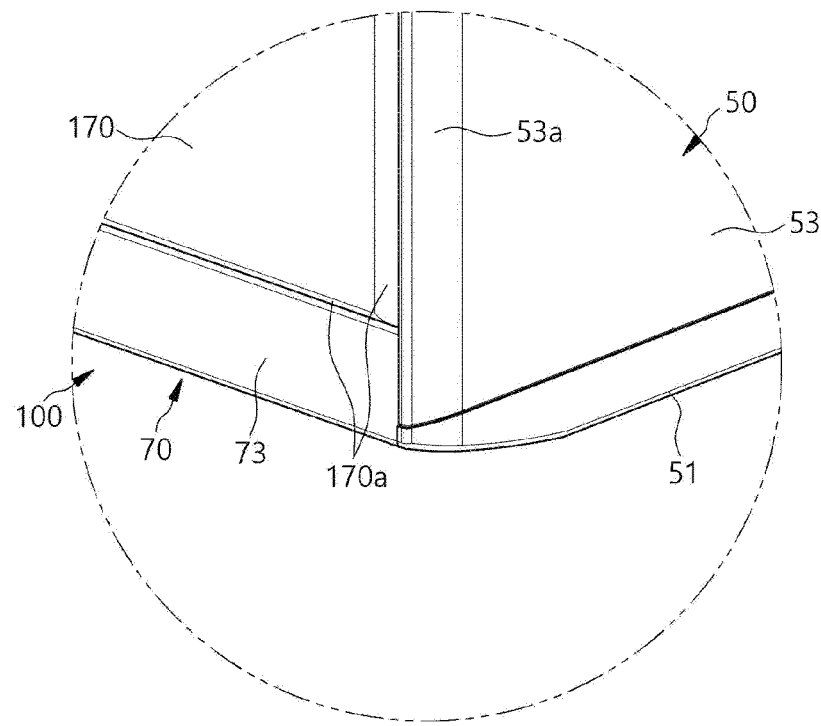
FIG. 4 is an enlarged-perspective view showing a lower corner of the door assembly shown in FIG. 2.

As shown in FIG. 4, the lower plate 51 of the door body 50 may include a frame cover 70. The frame cover 70 may be formed into a separate object from the lower plate 51 or integrally foiled with the lower plate 51. The frame cover 70 may protrude forward from the lower plate 51, and support a lower edge surface 170a of the front panel 170.

As shown in the structure of the frame cover 70, the frame cover 70 may include a lower cover portion 71 connected to the lower plate 51, and a shield end 73 extending upward from the lower cover portion 71. The lower cover portion 71 may cover a lower portion of a panel frame 110 covering the lighting device 130 to be described below. Then, the shield end 73 may support the lower edge surface 170a, i.e., an end portion of the front panel 170.

The frame cover 70 may cover and shield parts such as the panel frame 110, etc. at a lower portion of the front panel 170 so that the parts may not be exposed. Furthermore, since the shield end 73 of the frame cover 70 supports the lower end of the front panel 170, the front panel 170 or the entire lighting panel 100 may be prevented from being separated from the door body 50 by the weight of the front panel 170. Specifically, even when the door assembly of the embodiment is used in a product with a door that is opened and closed repeatedly, such as a refrigerator, Styler®, a dishwasher, etc., the frame cover 70 connected to the door body 50 may stably support the front panel 170 from the lower side of the front panel 170, so that vibration generated in a door-opening and closing process may be reduced. The reference numeral 73a may indicate a seating portion of the shield end 73, the seating portion being engaged with the lower edge surface 170a of the front panel 170, and the seating portion 73a may be formed in a curved surface corresponding to the lower edge surface 170a of the front panel 170.

Next, the lighting panel 100 will be described. The lighting panel 100 may be coupled to a front portion of the door body 50, and may form a front surface of the door assembly 20. The lighting panel 100 may be a part exposed to the user and, specifically, may form a front surface of the refrigerator, so it may be said that the lighting panel 100 may be the part most exposed to users. More specifically, the lighting panel 100 may be arranged at the front side of the door body 50 and, herein, the front side of the door body 50 may include a front surface of the door body 50, and may indicate an inner space where the door body 50 may be recessed.

In the present disclosure, the lighting panel 100 may be illuminated and implement various colors and different levels of brightness. Therefore, the lighting panel 100 may serve to improve the esthetic of the refrigerator according to user's preference. Hereinbelow, the structure of the lighting panel 100 will be described on the basis of the luminescent function of the lighting panel 100.

Figure 5:
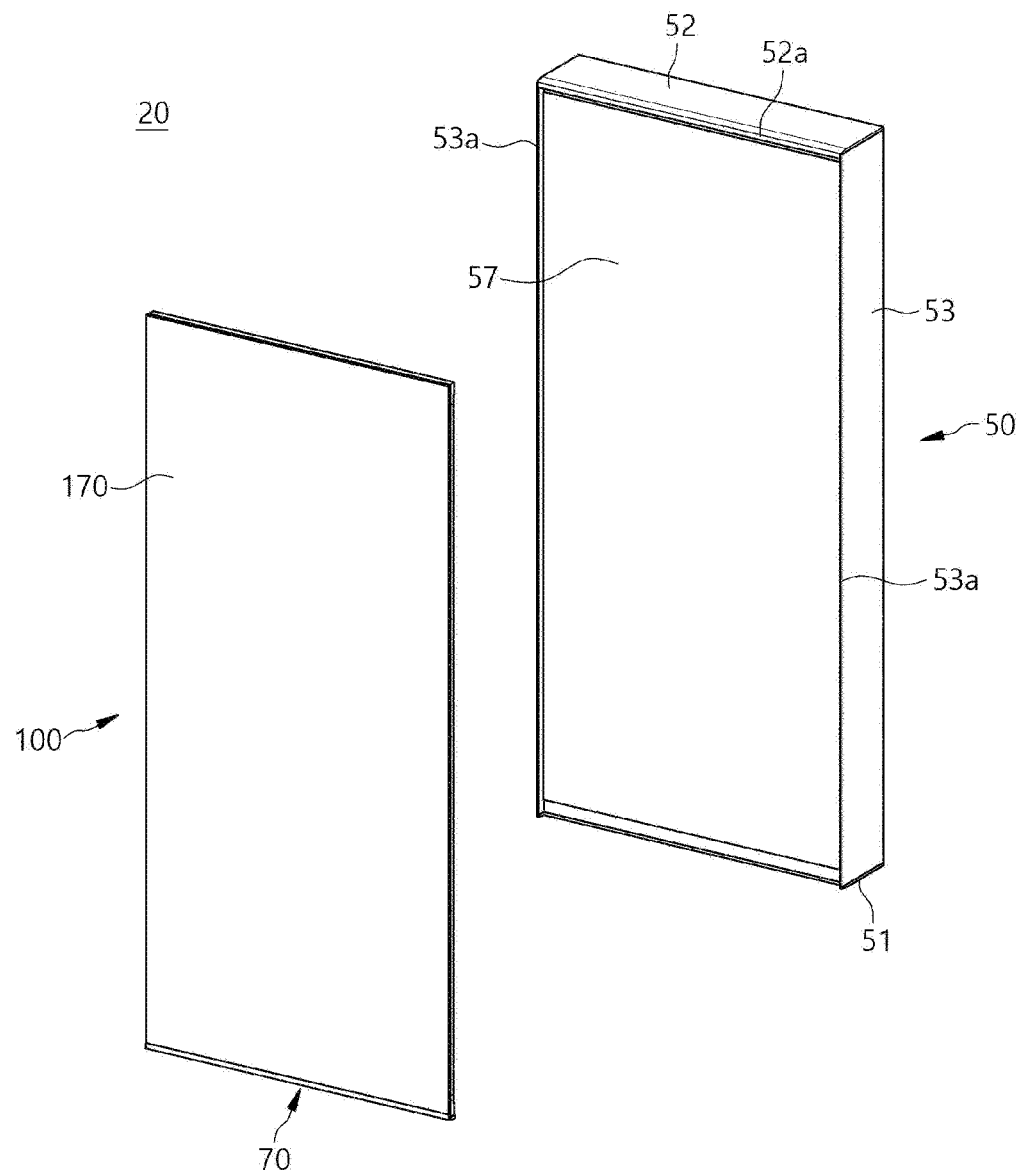
FIG. 5 is a perspective view showing a door body and a lighting panel constituting the door assembly shown in FIG. 2, wherein the door body and the lighting panel are separated from each other.
Figure 7:
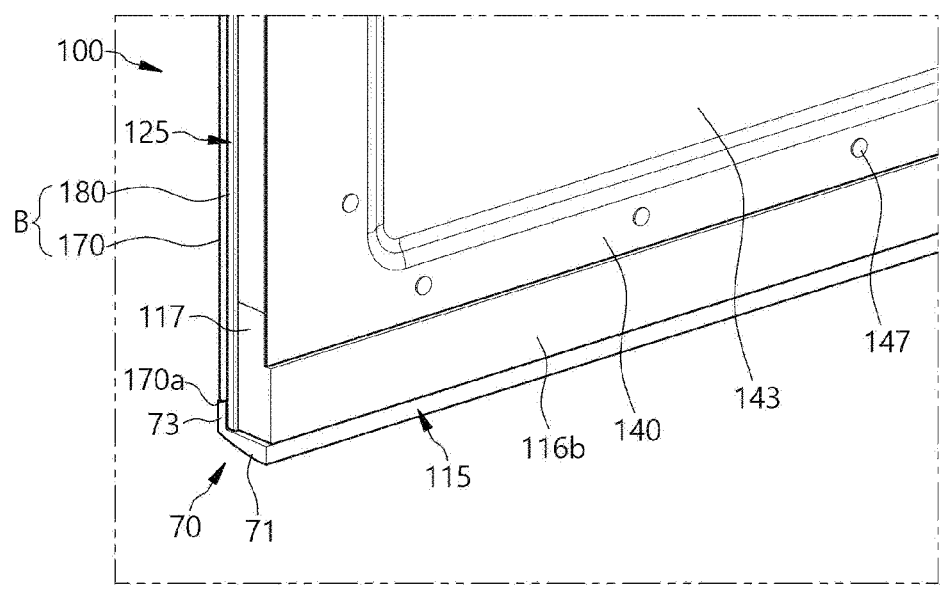
FIG. 7 is a perspective view showing a lower structure of the lighting panel shown in FIG. 6.

As shown in FIGS. 5 and 6, the lighting panel 100 may have a rough rectangular plate shape. The lighting panel 100 may be arranged at the front side of the front plate 57 of the door body 50. The lighting panel 100 may be attached to the front plate 57 by an adhesive or an adhesive tape, but in the embodiment, the lighting panel 100 may be fixed to the front plate 57 in a hooked manner by a hook 147. As shown in FIG. 7, the hook 147 may be provided on a rear surface of the lighting panel 100, more specifically, on a back cover 140, and the lighting panel 100 may be fixed to the door body 50 as the hook 147 is hooked in a hooked groove (not shown) of the front plate 57. A plurality of hooks 147 may be arranged along an edge of the back cover 140.

As shown in FIG. 5, the lighting panel 100 may be formed in the shape corresponding to the front plate 57. The lighting panel 100 may include a plurality of parts, and when the parts are assembled to each other first and the lighting panel 100 is completed, the lighting panel 100 may be coupled to the front plate 57 of the door body 50.

As shown in FIG. 7, the frame cover 70 may be coupled to at the lower portion of the lighting panel 100 as described above. The frame cover 70 may cover the lower portion of the lighting panel 100 and, more specifically, in the panel frame 110 of the lighting panel 100, the frame cover 70 may surround a lower portion of a lower frame 115 constituting the lower portion and a front surface of the diffusion panel 180. The shield end 73 of the frame cover 70 may cover a front surface of a lower end 180a1 of the diffusion panel 180, which may extend more downward than the front panel 170, so that the part may be prevented from being exposed forward. Further, the shield end 73 may prevent an edge of the lower end of the front panel 170 from having a hot spot. This structure will be described below. For reference, the hot spot may mean a portion that looks relatively brighter than the other parts.

Figure 20:
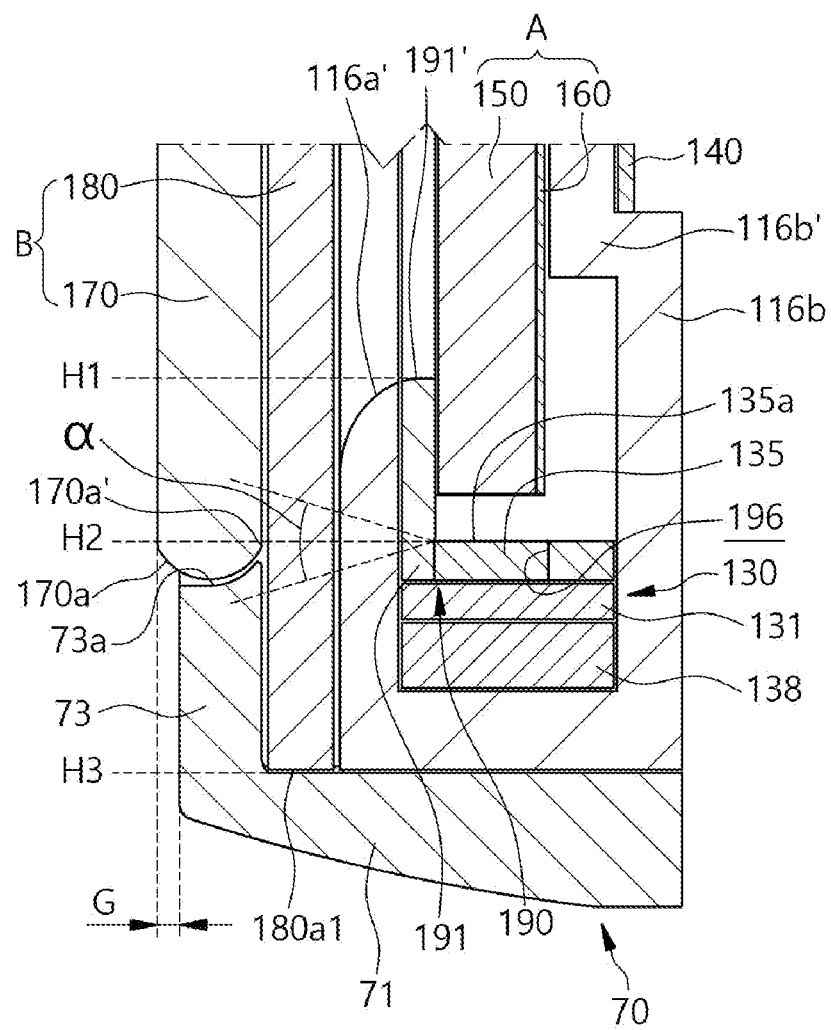
FIG. 20 is an enlarged-sectional view showing the lower structure of the lighting panel according to the embodiment of the present disclosure.

Herein, the front panel 170 may protrude farther forward than the shield end 73. Accordingly, when looking at the front panel from a user's eye level, the shield end 73 may be covered by the front panel 170, and an area where the frame cover 70 including the shield end 73 is exposed may be reduced. As shown in FIG. 20, the front panel 170 protrudes further than the shield end 73 and a predetermined gap G is formed between the front panel 170 and the shield end 73.

Therefore, the edge surface 170a of the front panel 170 may protrude farther forward than the upper cover 52a, the side cover 53a, and the frame cover 70 which constitute the door body 50, and the area of the front panel 170 exposed to the user may increase and a three-dimensional effect may increase.

The lighting device 130 may be provided inside the lower frame 115, and in FIG. 7, the lighting device 130 may be shielded by the lower frame 115. Then, side frames 125 may be connected to an upper portion of the lower frame 115, and the back cover 140 may be arranged at the rear side of the panel frame 110 formed of the lower frame 115 and the side frames 125.

Figure 8:
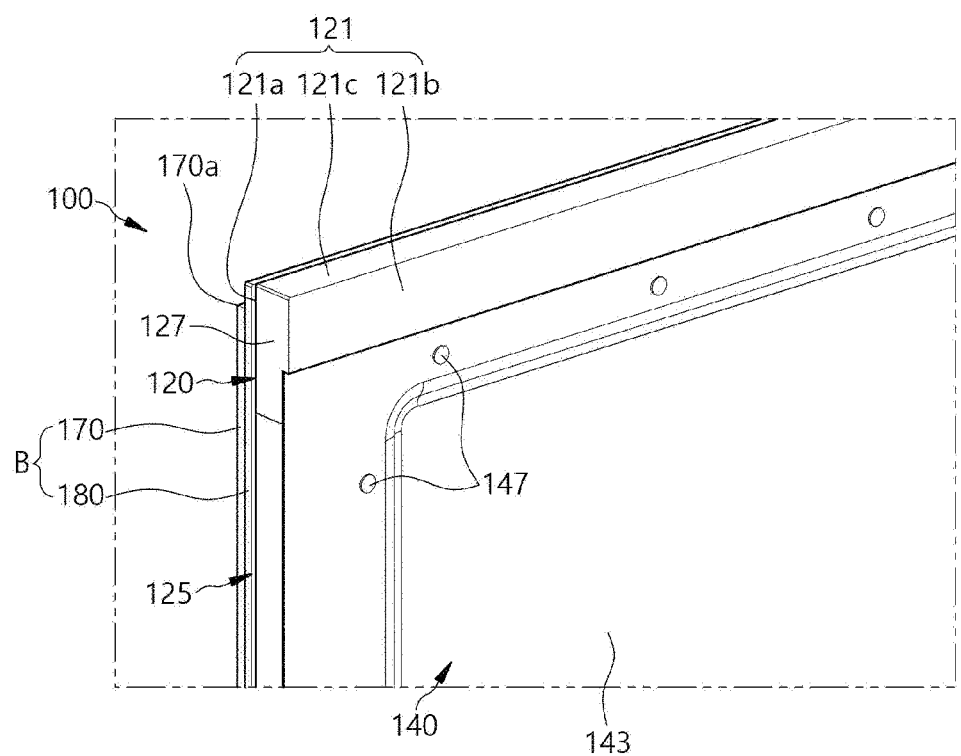
FIG. 8 is a perspective view showing an upper structure of the lighting panel shown in FIG. 6.

As shown in FIG. 8, an upper frame 120 may be arranged on the upper portion of the lighting panel 100. In the embodiment, the frame cover 70 may not be provided at an outside portion of the upper frame 120. An upper cover 52a (referring to FIG. 3) of the upper plate 52 of the door body 50 descried above may be located at an upper portion of the upper frame 120. The upper cover 52a may protrude farther forward than the upper frame 120 and may cover an upper portion of the diffusion panel 180.

The separate lighting device 130 may not be embedded inside the upper frame 120. Then, the side frames 125 may extend downward from opposite ends of the upper frame 120. The back cover 140 may be arranged at the rear side of the panel frame 110 foiled of the upper frame 120 and the side frames 125.

Figure 9:
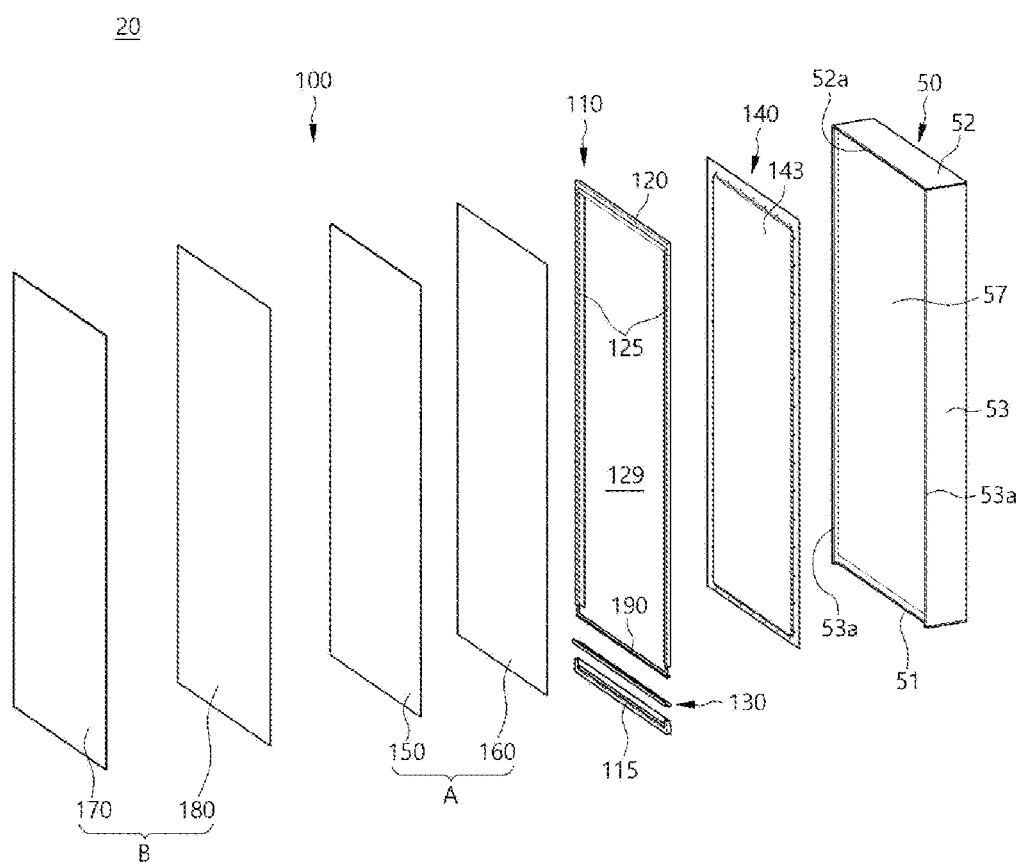
FIG. 9 is an exploded-perspective view showing parts constituting the door assembly according to the embodiment of the present disclosure.

As shown in FIG. 9, the parts constituting the door assembly 20 according to the embodiment are shown in the disassembled state. When showing the structure of the lighting panel 100, the lighting panel 100 may include the panel frame 110, and 5 sheet parts which may form the frame of the lighting panel 100. The 5 sheet parts may have similar sizes and shapes, and be stacked together.

The 5 sheet parts may be classified into (i) a first plate module A including a light guide panel 150 arranged to face an edge of the lighting device 130, and a reflection panel 160 arranged at the rear side of the light guide panel 150, and (ii) a second plate module B arranged at the front side of the first plate module A, and including the front panel 170 constituting the front surface of the lighting panel 100, and the diffusion panel 180 attached to the front panel 170. Then, the back cover 140 may be arranged behind both the first plate module A and the second plate module B.

In the embodiment, the lighting device 130 may be arranged at the lower portion of the lighting panel 100. The lighting device 130 may be arranged at the lower frame 115 of the panel frame 110. The lighting device 130 may be stored in a lower mounting groove 118 (referring to FIG. 11) formed in the lower frame 115. A light source 135 of the lighting device 130 may be arranged to face the upper side, and the light guide panel 150 arranged above the light source may diffuse light of the light source 135. Then, the second plate module B arranged at the front side of the light guide panel 150 may be illuminated by receiving the light transmitted from the light guide panel 150, and light transmitted from the light source 135 through the lower frame 115.

Figure 10:
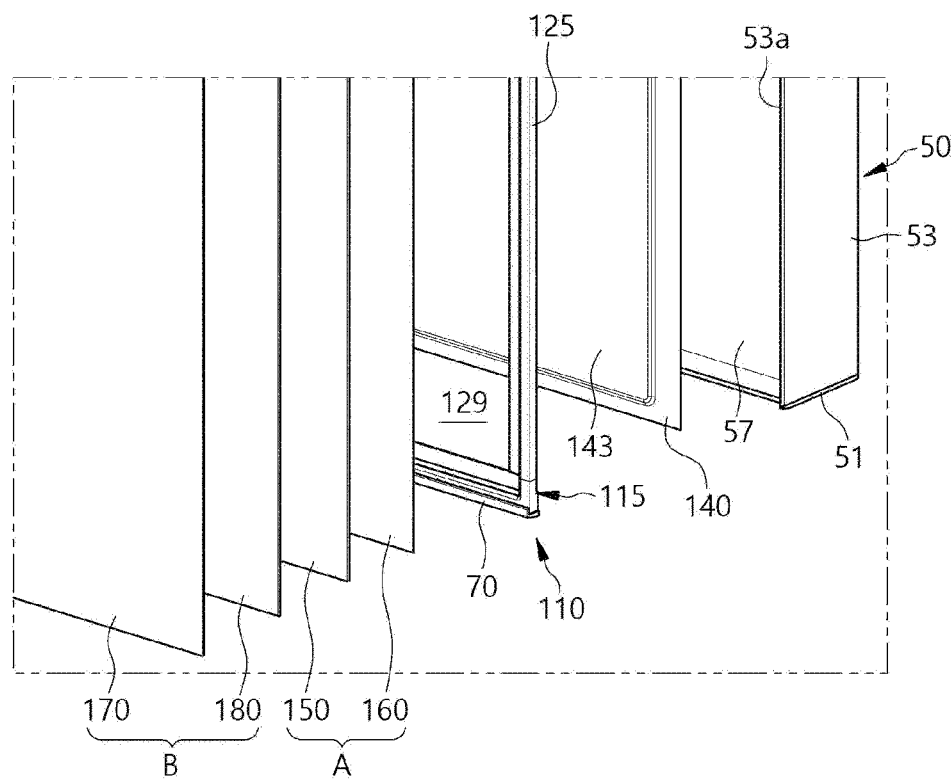
FIG. 10 is an enlarged-perspective view showing a lower structure of the exploded parts constituting the door assembly according to the embodiment of the present disclosure.

As shown in FIG. 10, the four parts constituting the panel frame 110 are coupled to each other, and the first plate module A and the second plate module B are arranged at the front side of the panel frame 110. Actually, before the lower frame 115, the upper frame 120, and the pair of side frames 125 constituting the panel frame 110 are assembled, the four parts in the separated state may be assembled while covering edges of the first plate module A.

In FIG. 10, the frame cover 70 is coupled to the lower frame 115 arranged at the lower portion of the panel frame 110. The frame cover 70 may be coupled to the lower plate 51 while being coupled to the lower frame 115, but the lower frame 115 may be seated on the frame cover 70 while the frame cover 70 may be seated the lower plate 51.

Figure 11:
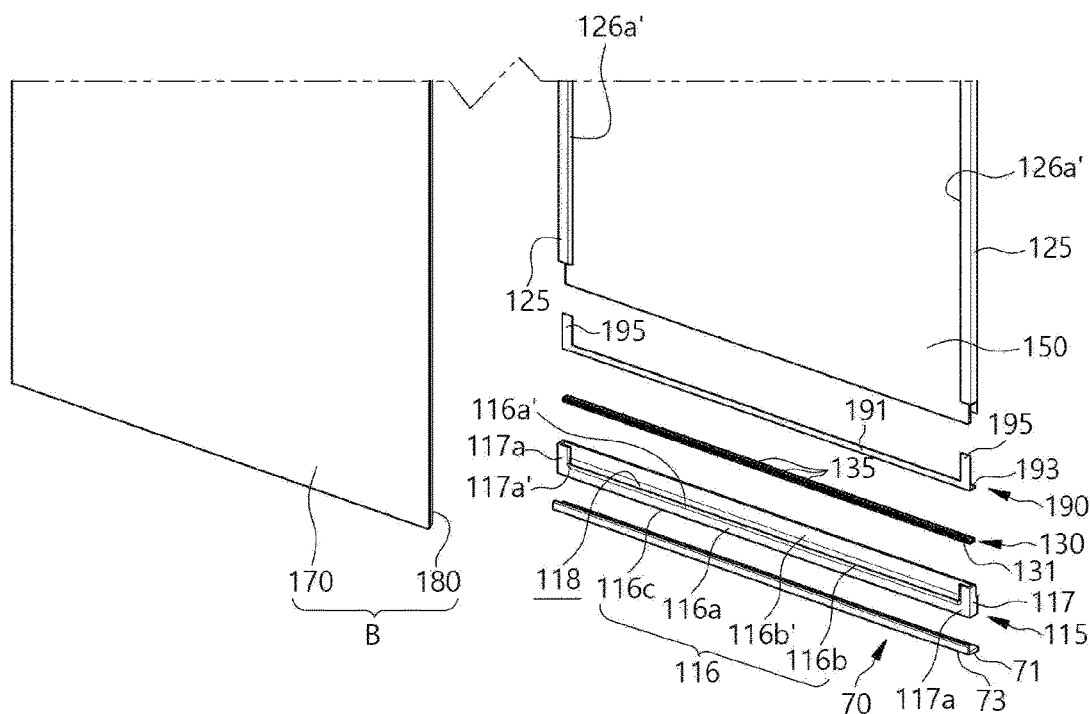
FIG. 11 is a perspective view showing a panel module and a lighting device constituting the door assembly according to the embodiment of the present disclosure, wherein the panel module and the lighting device are separated from a lighting module.

As shown in FIG. 11, the lower frame 115 constituting the panel frame 110 may be disassembled downward and the lighting device 130 and a diffusion strip 190, which will be described below, are exposed. As shown in the drawing, the lighting device 130 may be stored in the lower mounting groove 118 having the shape depressed on the lower frame 115, and the diffusion strip 190 may be arranged in front of the lighting device 130 in the lower mounting groove 118. When the lighting device 130 and the diffusion strip 190 are stored in the lower mounting groove 118, the lower frame 115 may cover a lower portion of the first plate module A and be coupled to the pair of side frames 125.

Figure 12:
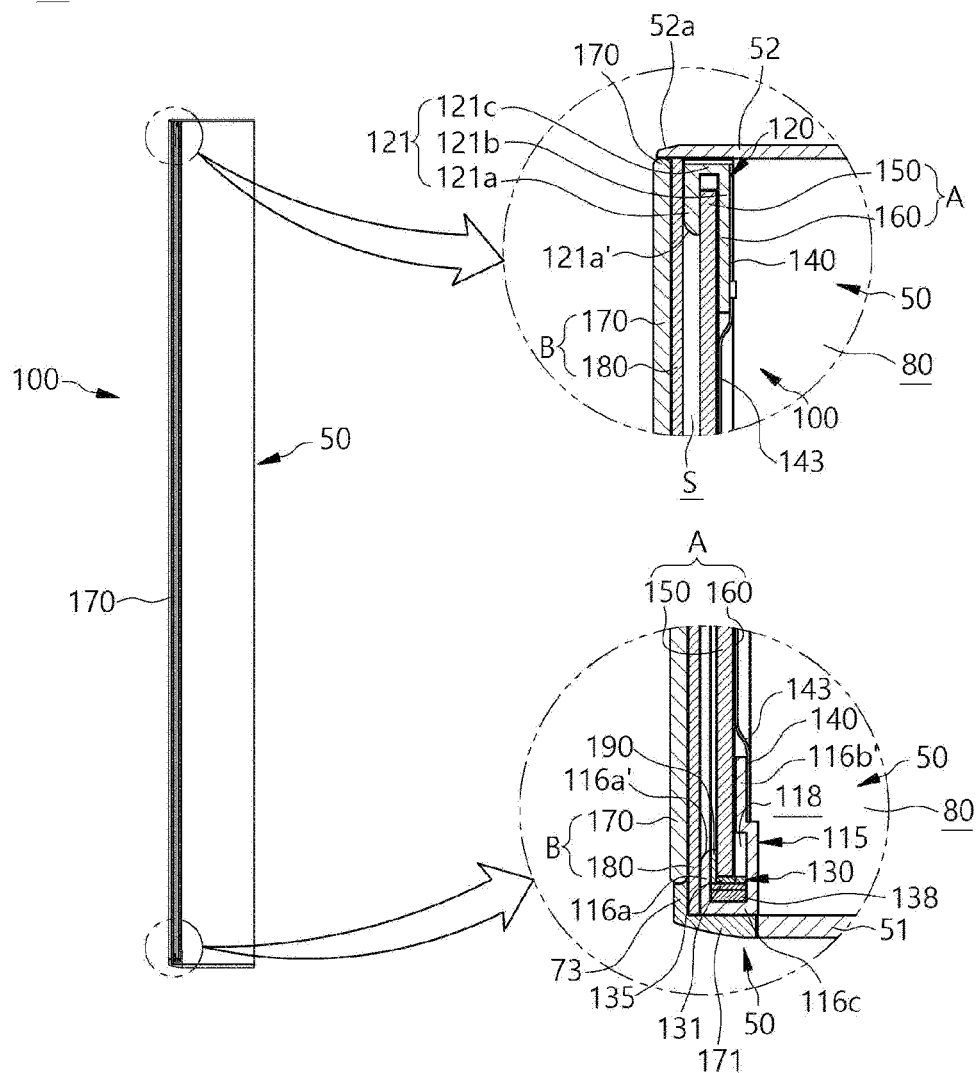
FIG. 12 is a perspective view showing a structure of a frame constituting the embodiment of the present disclosure.
Figure 13:
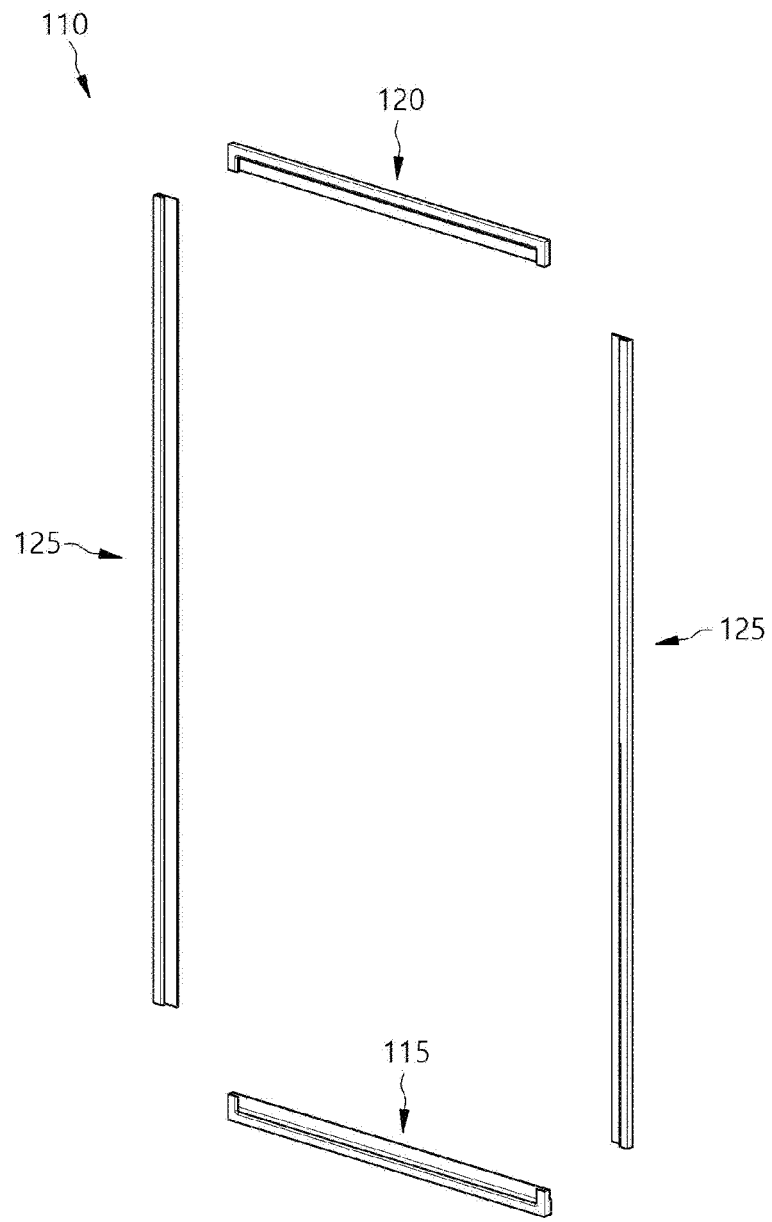
FIG. 13 is an exploded-perspective view showing parts constituting the frame shown in FIG. 12.

Referring to FIGS. 12 to 16, the structure of the panel frame 110 will be described in detail. First, as shown in FIG. 12, the panel frame 110 is approximately formed in a rectangular frame shape, and a hollow coupling space 129 may be formed in the center thereof. The coupling space 129 may also be formed in a rectangular shape, and the first plate module A may be arranged in the coupling space 129.

As shown in enlarged views of FIG. 12, a front surface and a rear surface of the panel frame 110 may not be symmetric to each other, and a rear surface portion 116b', 121b constituting the rear surface may be provided longer than a front surface portion 116a, 121a constituting the front surface. In other words, the rear surface portion may protrude further than the front surface portion in a direction toward the center portion of the coupling space 129. This structure may allow the panel frame 110 to stably support the first plate module A behind thereof.

Each of the lower frame 115, the upper frame 120, and the pair of side frames 125 constituting the panel frame 110 may have a "C"-shaped cross-section. The depressed structure may allow the panel frame 110 to cover the edges of the first plate module A. The lower frame 115, the upper frame 120, and the pair of side frames 125 may have in common the front surface portion 116a, 121a, 126a, the rear surface portion 116b, 121b, 126b, and a connection portion 116c, 121c, 126c, and a mounting groove 118, 124, 128 may be formed between the front, rear, and bottom surfaces, and a detailed structure thereof will be described below.

The panel frame 110 may be made of a synthetic resin material, and may transmit light. The panel frame 110 may be made of transparent or translucent synthetic resin material, and may transmit the light emitted from the light source 135 of the lighting device 130 to the front side. In other words, the panel frame 110 may be a transmission medium itself.

As described above, since the panel frame 110 transmit the light, shading generated along the edges of the lighting panel 100 with the panel frame 110 may be prevented. However, when the panel frame 110 is made of an opaque material, the light of the light source 135 may be transmitted to the front panel 170 only through the light guide panel 150. Therefore, dark regions may be generated at edges of the front panel 170 corresponding to the front side of the panel frame 110.

According to the embodiment, the panel frame 110 may be made of a white translucent material. Accordingly, the panel frame 110 may diffuse the light and transmit the light forward.

Figure 14:
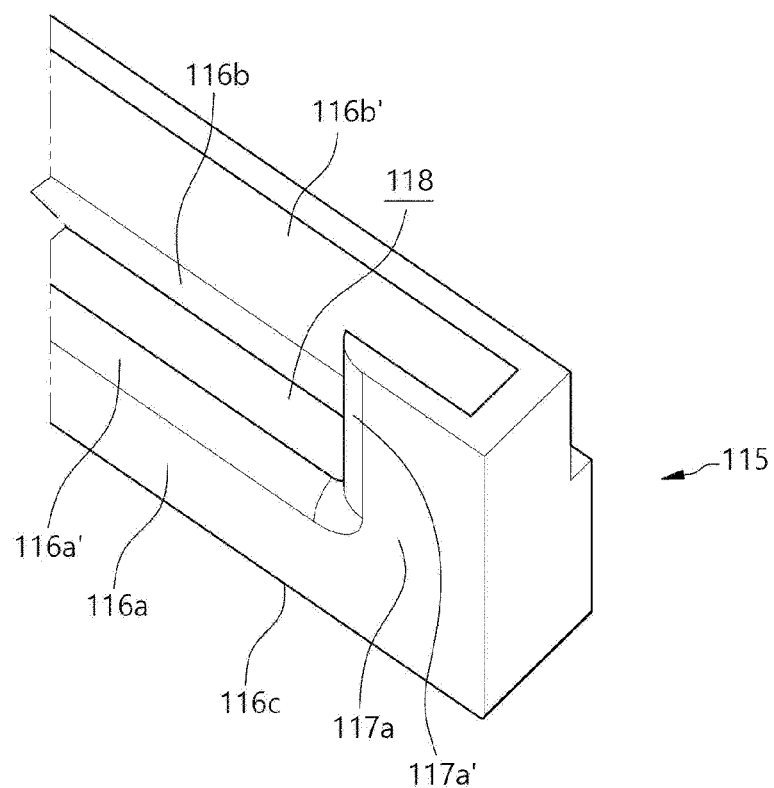
FIG. 14 is a perspective view showing a structure of a lower frame constituting the frame shown in FIG. 12.

Referring to FIGS. 12 and 14, the lower frame 115 constituting the panel frame 110 may have a rough "C"-shaped cross-section, and may extend in one direction. The lower frame 115 may include a lower front surface portion 116a constituting a front surface thereof, a lower rear surface portion 116b provided spaced apart from and in parallel to the lower front surface portion 116a, and a lower connection portion 116c connecting the lower front surface portion 116a to the lower rear surface portion 116b.

The depressed lower mounting groove 118 may be formed between the lower front surface portion 116a, the lower rear surface portion 116b, and the lower connection portion 116c. Both the lighting device 130 and the diffusion strip 190 may be stored in the lower mounting groove 118, and a lower edge of the first plate module A may be fitted into the lower mounting groove 118.

The lower front surface portion 116a may be in contact with a front surface of the light guide panel 150. The lower front surface portion 116a may be directly in contact with the front surface of the light guide panel 150, but in the embodiment, and the diffusion strip 190 may be arranged between the front surface of the light guide panel 150 and the lower front surface portion 116a. Therefore, the lower front surface portion 116a may have the length at least equal to or longer than the length of the diffusion strip 190.

In other words, the lower front surface portion 116a may cover both the diffusion strip 190 and the light guide panel 150, and may fix the diffusion strip 190 and the light guide panel 150 without a gap.

Figure 19:
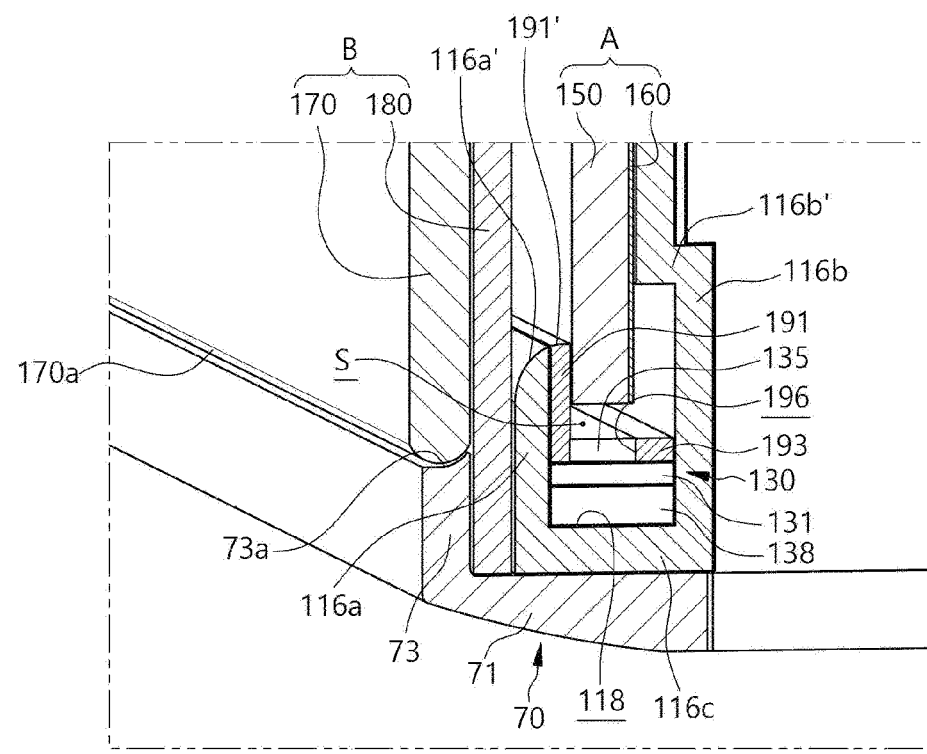
FIG. 19 is an enlarged perspective view showing a lower portion of FIG. 17.

As shown in FIG. 19, the diffusion panel 180 may be arranged in front of the lower front surface portion 116a, and both the diffusion strip 190 and the light guide panel 150 may be arranged behind of the lower front surface portion 116a. In other words, the lower front surface portion 116a of the lower frame 115 may be arranged between the diffusion panel 180 and the light guide panel 150 to cover an edge portion of the light guide panel 150, and herein, the lower front surface portion 116a of the lower frame 115 may be in closed contact with both the diffusion panel 180 and the light guide panel 150.

In the embodiment, the front panel 170, the diffusion panel 180, the lower front surface portion 116a, the diffusion strip 190, the light guide panel 150, and the lower rear surface portion 116b may be consecutively in close contact with each other. In other words, the parts may be stacked together without gaps. Herein, the front panel 170 and the diffusion plate 180 may be in close contact with each other without a gap, and an adhesive may spread between the front panel 170 and the diffusion plate 180, or the front panel 170 and the diffusion plate 180 may be in close contact with each other by static electricity.

As described above, since the parts are consecutively in close contact with each other, even when the door assembly 20 is used in the refrigerator and repeated to be opened and closed, the parts may be prevented from being may twist or deviate. In other words, the alignment of the parts may be solidly maintained, and thus the light of the light source 135 may be diffused always evenly through the front panel 170.

Figure 21:
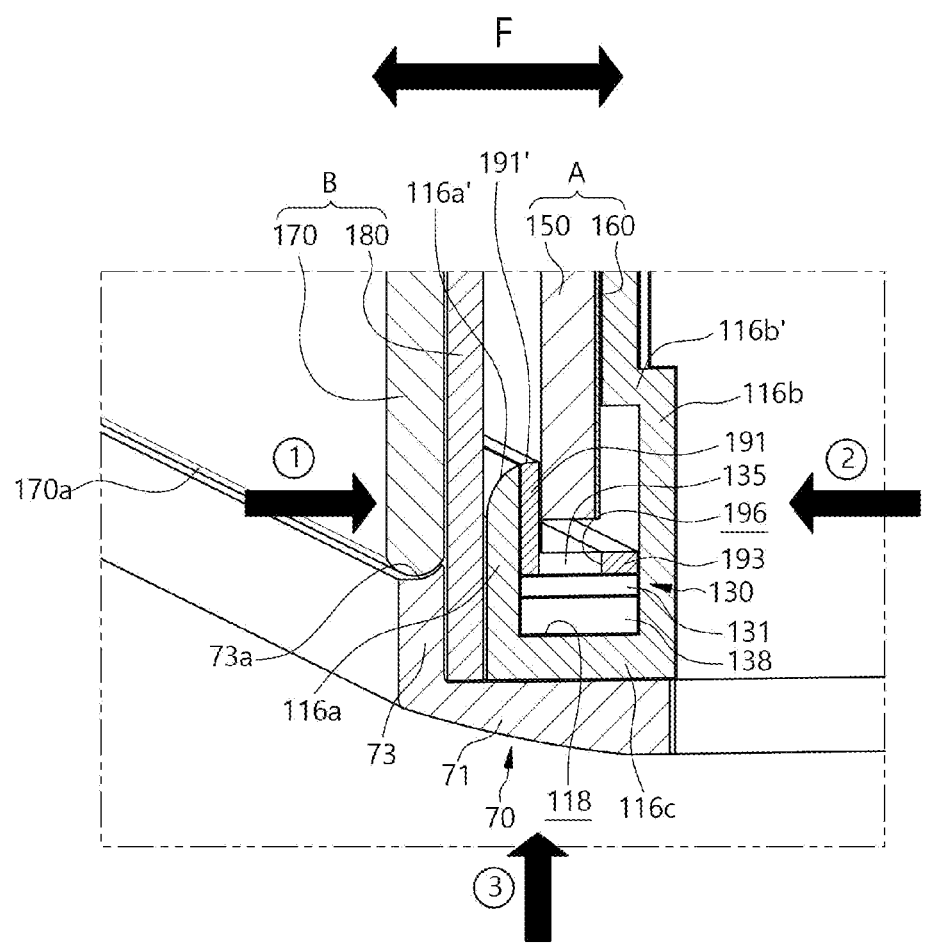
FIG. 21 is a concept view showing a support structure of the door assembly according to the present disclosure.

Referring to FIG. 21, when a door assembly 20 is used in a refrigerator, etc., a longitudinal external force (in direction of arrow F) may be applied to the door assembly 20. In the embodiment, the front panel 170, the diffusion plate 180, the lower front surface portion 116a, the diffusion strip 190, the light guide panel 150, and the lower rear surface portion 116b may be in the forward and rearward directions (directions of arrows ① and ②) sequentially, the parts may be maintained in a solidly fixed state.

Furthermore, the frame cover 70 may be arranged below the front panel 170, the diffusion plate 180, the lower front surface portion 116a, the diffusion strip 190, the light guide panel 150, and the lower rear surface portion 116b, and the frame cover 70 may support the front panel 170, the diffusion plate 180, the lower front surface portion 116a, the diffusion strip 190, the light guide panel 150, and the lower rear surface portion 116b from the lower side (referring to arrow ③). Therefore, the front panel 170 or the entire lighting panel B may be prevented from being separated from the door assembly 100 by the weight of the front panel 170.

Meanwhile, a diffusion end 116a' may be formed on an edge of the lower front surface portion 116a. The diffusion end 116a' may be formed along a protruding end of the lower front surface portion 116a. The diffusion end 116a' may be formed in a curved surface or an inclined surface so that an angled corner is not famed at the end of the lower front surface portion 116a. As shown in FIG. 14, the diffusion end 116a' may be sequentially formed in a longitudinal direction of the lower front surface portion 116a.

The diffusion end 116a' may prevent the end of the lower front surface portion 116a from being shaded. When an end of the lower front surface portion 116a is formed in an angled corner, the corner does not receive the light and may be shaded, and a kind of boundary may be generated while contrasting with a bright region. The diffusion end 116a' may allow the light of the light source 135 to be diffused throughout the entire region of the lower front surface portion 116a, thereby preventing the light from being focused on a specific region or from being not transmitted.

Referring to FIG. 20, the diffusion end 116a' may be arranged further closer to a center portion of the lighting panel 100 than the edge surface 170a of the front panel 170. Herein, the center portion of the lighting panel 100 may mean an area center of the lighting panel 100. In the embodiment, the diffusion end 116a' may be located further upward than the edge surface 170a of the front panel 170, so that shading generated at the end of the lower front surface portion 116a may be diffused to locations far from the edge surface 170a of the front panel 170.

The lower rear surface portion 116b may be spaced apart from the lower front surface portion 116a, and support a rear surface of the light guide panel 150. The lower rear surface portion 116b may protrude further than the lower front surface portion 116a and the height thereof may be high. Since the front panel 170 is located in front of the lower front surface portion 116a, the lower front surface portion 116a has the diffusion end 116a' so as to diffuse light, but the diffusion end 116a' may be omitted in the lower rear surface portion 116b.

Figure 17:
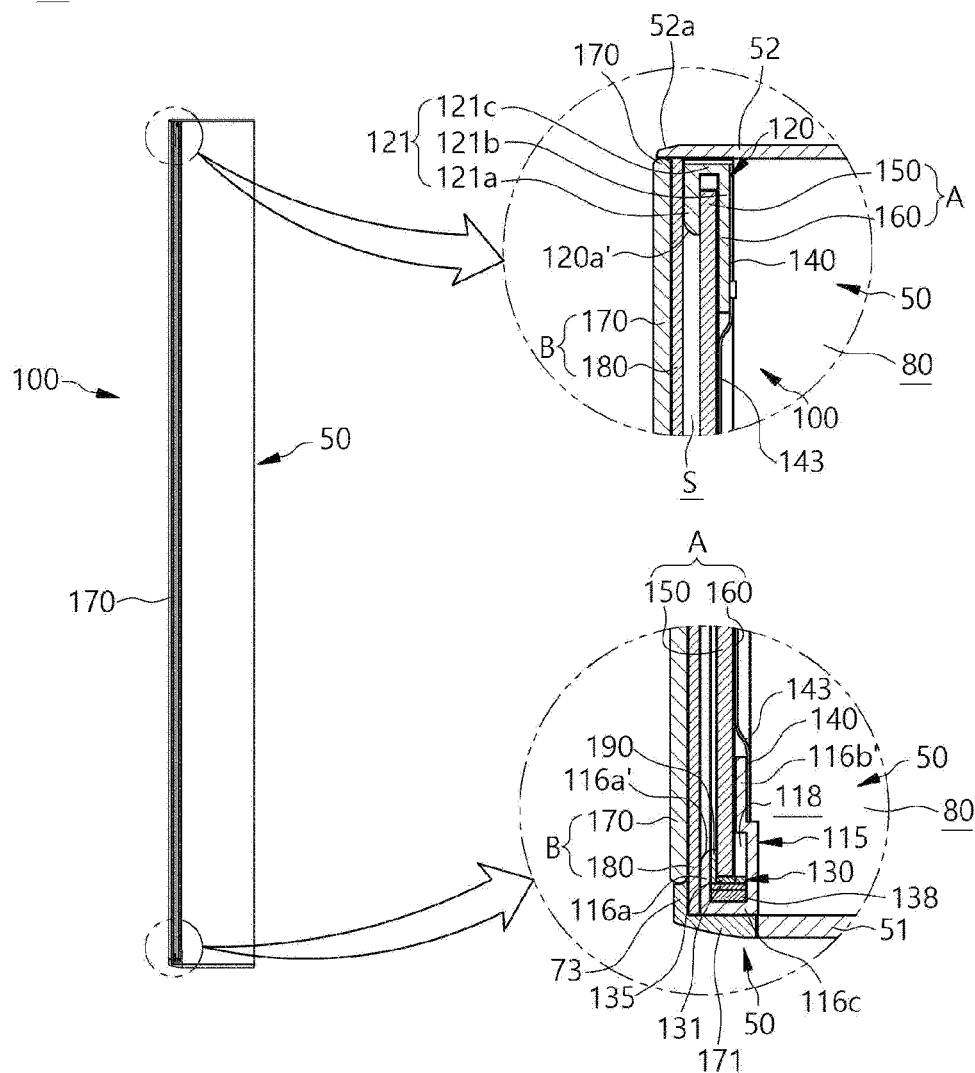
FIG. 17 is a sectional view taken along line XII-XII' in FIG. 2.

The lower rear surface portion 116b is connected to a lower stepped portion 116b'. The lower stepped portion 116b' may be formed further higher in a direction in which the height of the lower rear surface portion 116b is increased. The lower stepped portion 116b' may be located in front of the lower rear surface portion 116b. Therefore, a step may be formed between the lower rear surface portion 116b and the lower stepped portion 116b'. Referring to FIG. 17, an edge of the back cover 140 may be seated on the stepped portion.

The lower connection portion 116c may connect a lower end of the lower front surface portion 116a to a lower end of the lower rear surface portion 116b. Then, the bottom of the lower mounting groove 118 may be the lower connection portion 116c.

Guide fences 117a may be respectively provided at opposite ends of the lower frame 115. The guide fences 117a may protrude upward, i.e., in a direction toward the side frames 125, from the opposite ends of the lower frame 115. The guide fences 117a may make the height of the lower frame covering the first plate module A higher, so that the first plate module A may be stably fitted into the lower mounting groove 118.

Each of the guide fences 117a may include a diffusion end 117a'. Since each of the guide fences 117a may be exposed to the front side toward the front panel 170, so that the diffusion end 117a' may prevent the light from being not transmitted to a specific region. The diffusion end 117a' of the guide fences 117a may be consecutively connected to the diffusion end 116a' of the lower front surface portion 116a.

Figure 15:
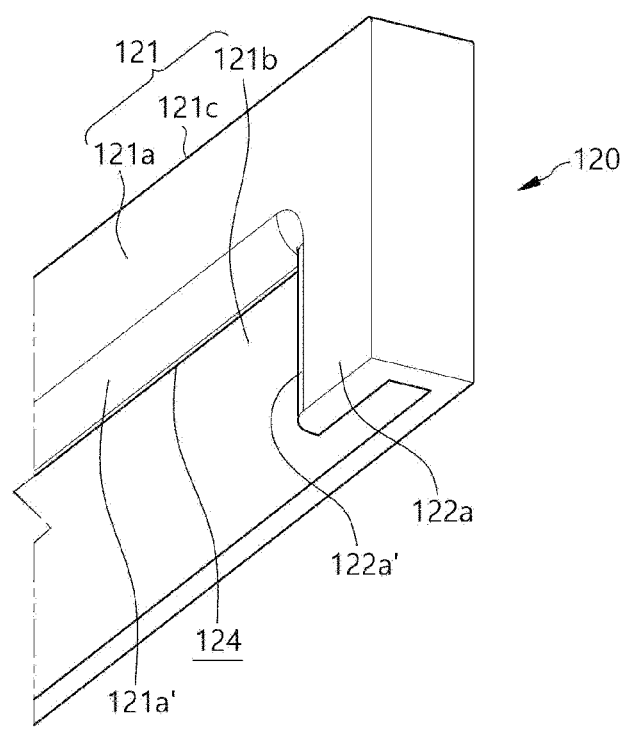
FIG. 15 is a perspective view showing a structure of an upper frame constituting the frame shown in FIG. 12.

FIG. 15 is a view showing the upper frame 120 constituting the panel frame 110. The upper frame 120 may have a "C"-shaped cross-section as in the lower frame 115, and extend in one direction. An upper mounting groove 124 may be depressed from the upper frame 120, but the lighting device 130 is not stored in the upper mounting groove 124. Only an edge of the first plate module A may be fitted into the upper mounting groove 124.

In the structure of the upper frame 120, the upper frame 120 may include an upper front surface portion 121a constituting a front surface of the upper frame 120, an upper rear surface portion 121b spaced apart from and parallel to the upper front surface portion 121a, and an upper connection portion 121c connecting the upper front surface portion 121a to the upper rear surface portion 121b.

The depressed upper mounting groove 124 may be formed between the upper front surface portion 121a, the upper rear surface portion 121b, and the upper connection portion 121c. Only an edge of the first plate module A may be fitted into the upper mounting groove 124. In FIG. 18, an empty space may be formed between an end of the light guide panel 150 and the bottom of the upper mounting groove 124, and the empty space may correspond to stretching of the light guide panel 150. Otherwise, the empty space may be omitted.

Referring to FIG. 18, the upper front surface portion 121a may be in contact with the front surface of the light guide panel 150. The upper front surface portion 121a may be in contact with an upper front surface of the light guide panel 150, and unlike the lower front surface portion 116a described above, the diffusion strip 190 may be omitted between the upper front surface portion 121a and the upper front surface of the light guide panel 150.

A diffusion end 121a' may be formed at an edge of the upper front surface portion 121a. The diffusion end 121a' may be formed along a protruding end of the upper front surface portion 121a. Like the diffusion end 116a' of the lower front surface portion 116a, the diffusion end 121a' may be formed in a curved surface and an inclined surface so that an end of the upper front surface portion 121a does not have an angled corner. As shown in FIG. 15, the diffusion end 121a' may be consecutively formed in a longitudinal direction of the upper front surface portion 121a.

The diffusion end 121a' may prevent the end of the upper front surface portion 121a from being shaded. When the end of the upper front surface portion 121a is famed into an angled corner, the light may not be transmitted to the corner and the corner may be shaded. The diffusion end 121a' may allow the light of the light source 135 to be diffused throughout the entire region of the upper front surface portion 121a, thereby preventing the light from being focused on a specific region or from being not transmitted.

Although the light source 135 is not arranged adjacent to the upper front surface portion 121a unlike the lower front surface portion 116a, the light of the light guide panel 150 may be transmitted to the upper front surface portion 121a, so that it may be preferable that the upper front surface portion 121a may also include the diffusion end 121a'.

The upper rear surface portion 121b may be spaced apart from the upper front surface portion 121a, and support the rear surface of the light guide panel 150. The upper rear surface portion 121b may protrude further than the upper front surface portion 121a and the length thereof may be long. Since the front panel 170 may be located in front of the upper front surface portion 121a, the upper front surface portion 121a may have the diffusion end 121a' so as to diffuse light, but the diffusion end 121a' may be omitted in the upper rear surface portion 121b.

The upper connection portion 121c may connect a lower end of the upper front surface portion 121a to a lower end of the upper rear surface portion 121b. Then, the bottom of the upper mounting groove 124 may be the upper connection portion 121c.

Guide fences 122a may be respectively provided at opposite ends of the upper frame 120. The guide fences 122a may protrude downward, i.e., in a direction toward the side frames 125, from the opposite ends of the upper frame 120. The guide fences 122a may make the height of the lower frame covering the first plate module A higher, so that the first plate module A may be stably fitted into the upper mounting groove 124.

Each of the guide fences 122a may include a diffusion end 122a'. Since each of the guide fences 122a is exposed to the front side toward the front panel 170, so that the diffusion end 122a' may prevent the light from being not transmitted to a specific region. The diffusion end 122a' of the guide fences 122a may be sequentially connected to the diffusion end 122a' of the upper front surface portion 122a.

Figure 16:
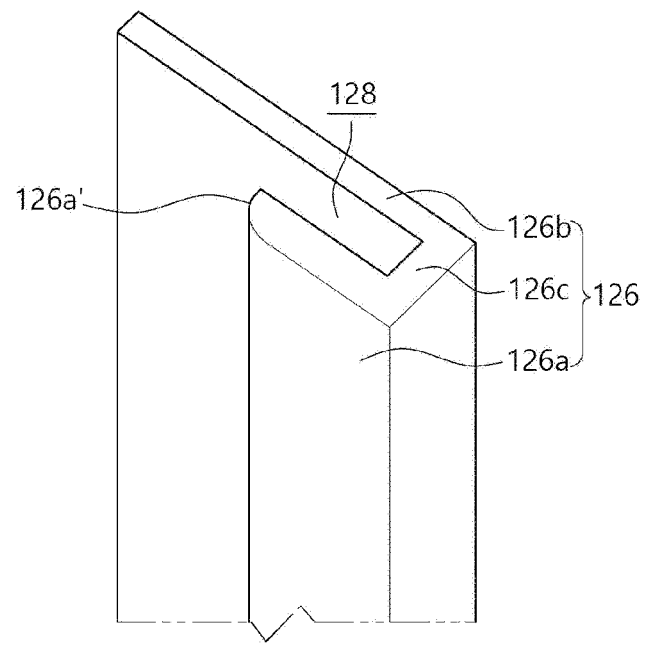
FIG. 16 is a perspective view showing a structure of a side frame constituting the frame shown in FIG. 12.

FIG. 16 is a view showing the side frames 125. Each of the side frames 125 may have a "⊂"-shaped cross-section as in the lower frame 115 and the upper frame 120, and extend in one direction. A side mounting groove 128 may be recessed from each of the side frames 125, but the lighting device 130 may not be stored in the side mounting groove 128. Only a side edge of the first plate module A may be fitted into the side mounting groove 128.

In the structure of the side frames 125, each of the side frames 125 may include a side front surface portion 126a constituting a front surface of the side frame 125, a side rear surface portion 126b spaced apart from and parallel to the side front surface portion 126a, and a side connection portion 126c connecting the side front surface portion 126a to the side rear surface portion 126b.

The recessed side mounting groove 128 may be formed between the side front surface portion 126a, the side rear surface portion 126b, and the side connection portion 126c. Only the edge of the first plate module A may be fitted into the side mounting groove 128. In FIG. 22, an empty space may be formed between an end of the light guide panel 150 and the bottom of the side mounting groove 128, and the empty space may correspond to stretching of the light guide panel 150. Otherwise, the empty space may be omitted.

Referring to FIG. 22, the side front surface portion 126a may be in contact with the front surface of the light guide panel 150. The side front surface portion 126a may be in contact with an upper front surface of the light guide panel 150, and unlike the lower front surface portion 116a described above, the diffusion strip 190 may be omitted between the side front surface portion 126a and the upper front surface of the light guide panel 150.

A diffusion end 126a' may be formed at an edge of the side front surface portion 126a. The diffusion end 126a' is formed along a protruding end of the side front surface portion 1261a. Like the diffusion end 116a' of the lower front surface portion 116a and the diffusion end 121a' of the upper front surface portion 121a, the diffusion end 126a' may be formed in a curved surface and an inclined surface so that an end of the side front surface portion 126a does not have an angled corner. As shown in FIG. 16, the diffusion end 126a' may be consecutively formed in a longitudinal direction of the side front surface portion 126a.

The diffusion end 126a' may prevent the end of the side front surface portion 126a from being shaded. When the end of the side front surface portion 126a is formed into an angled corner, the light may not be transmitted to the corner and the corner may be shaded. The diffusion end 126a' may allow the light of the light source 135 to be diffused throughout the entire region of the side front surface portion 126a, thereby preventing the light from being focused on a specific region or from being not transmitted.

Although the light source 135 is not arranged adjacent to the side front surface portion 126a unlike the lower front surface portion 116a, the light of the light guide panel 150 may be transmitted to the side front surface portion 126a, so that it may be preferable that the side front surface portion 126a may also include the diffusion end 126a'.

The side rear surface portion 126b may be spaced apart from the side front surface portion 126a, and support the rear surface of the light guide panel 150. The side rear surface portion 126b may protrude further than the side front surface portion 126a and the length thereof is long. Since the front panel 170 is located in front of the side front surface portion 126a, the side front surface portion 126a has the diffusion end 126a' so as to diffuse light, but the diffusion end 126a' may be omitted in the side rear surface portion 126b.

The side connection portion 126c may connect a lower end of the side front surface portion 126a to a lower end of the side rear surface portion 126b. Then, the bottom of the side mounting groove 128 may be the side connection portion 126c.

A lower end and an upper end of each of the side frames 125 may be respectively connected to the lower frame 115 and the upper frame 120. Coupling between the side frames 125 and the lower frame 115 and coupling between the side frames 125 and the upper frame 120 may be performed by an adhesive or an adhesive tape. Otherwise, coupling between the side frame 125 and the lower frame 115 and coupling between the side frame 125 and the upper frame 120 may be performed in a forcibly fitted manner or by high-frequency welding or ultrasonic welding.

Next, the lighting device 130 mounted to the lower frame 115 will be described. The lighting device 130 may ultimately illuminate the front panel 170. The lighting device 130 may emit light toward the light guide panel 150 so that the light guide panel 150 may transmit light to the second plate module B again, and the lighting device 130 may directly emit light to the second plate module B through the transparent lower frame 115. Furthermore, since light may be transmitted through all the lower frame 115, the upper frame 120, and the side frames 125 that cover the diffusion panel 180, the panel frame 110 may prevent a dark region from being generated on corners of the front panel 170.

In the structure of the lighting device 130 with reference to FIGS. 11 to 19, the lighting device 130 may include a substrate 131 extending in a long shape along a lower end of the lighting panel 100, and the light source 135 mounted to the substrate 131. The light source 135 may include LEDs. The light source 135 may include a plurality of light sources 135 arranged in a row along the substrate 131.

Each of the light sources 135 may be arranged at a location facing a lower end of the light guide panel 150 while the lighting device 130 is mounted to the lower frame 115. Then, the plurality of light sources 135 may be arranged below the lower end of the light guide panel 150, and may be successively arranged at predetermined intervals along the light guide panel 150.

Then, the light sources 135 may be configured to emit various colored lights. In other words, the plurality of light sources 135 may respectively emit different colored lights. For example, the light sources 135 may include a red light source, a green light source, and a blue light source.

As described above, the plurality of light sources 135 may be arranged such that the red light source, the green light source, and the blue light source are repeatedly arranged. Of course, the color arrangement of the plurality of light sources 135 according to color may be changed when necessary. Then, when the different colored light sources 135 are combined and turned on, an exterior color appearing on the front panel 170 may be variously realized. Then, when necessary, the light sources 135 may be configured to selectively emit a plurality of colors.

The plurality of light sources 135 may be successively arranged in one row along an upper surface of the substrate 131. Herein, the light sources 135 may be arranged at equally-spaced intervals, and the red light source, the green light source, and the blue light source may be combined as one set. Then, a plurality of light source sets 135 may repeat to be successively arranged. Furthermore, a substrate connector (not shown) to which the wires are connected may be provided on the upper surface of the substrate 131.

A heat emission block 138 may be arranged below the substrate 131. The heat emission block 138 may serve to emit heat generated from the light sources 135 and the substrate 131 to the outside space. The heat emission block 138 may have a bar shape extending long along the substrate 131, and in the embodiment, the heat emission block 138 may be made of an aluminum material. The heat emission block 138 may be arranged at a location opposite to the light sources 135 with the substrate 131 located between the heat emission block 138 and the light sources 135. Therefore, the heat emission block 138 may be located at the bottom in the lower mounting groove 118. A heat emission hole (not show) may be formed in the bottom in the lower mounting groove 118 to emit heat of the heat emission block 138.

Although not shown in the drawing, a plurality of heat emission fins may be provided in the heat emission block 138. The heat emission fins may increase a contact area between outside air and the heat emission block 138 to increase the heat emission performance of the heat emission block 138.

The back cover 140 may be arranged behind the panel frame 110. The back cover 140 may provide the rear surface of the panel frame 110, and may support the panel frame 110. The back cover 140 may have a rough rectangular plate shape, and have a size similar to the panel frame 110, so that the back cover 140 may support the panel frame 110. In the embodiment, the back cover 140 may be made of a metal material such as stainless or aluminum, but may be made of synthetic resin or various other materials.

Referring to FIG. 17, the panel frame 110 may be in close contact with an edge of the back cover 140, but the light guide panel 150 may be in close contact with a center portion of the back cover 140. A cover protrusion 143 may be formed at the center portion of the back cover 140, and the cover protrusion 143 may protrude toward the light guide panel 150 and may be in close contact with the rear surface of the light guide panel 150. In other words, edges of the light guide panel 150 may be surrounded by the panel frame 110, and the center portion of the light guide panel 150 may be supported by the cover protrusion 143 of the back cover 140. Therefore, the light guide panel 150 may be maintained in the stable mounted state.

Next, when showing the light guide panel 150, as shown in FIGS. 9 and 10, the light guide panel 150 may be located at the rear side of the front panel 170 while being spaced apart from the front panel 170. The light guide panel 150 may be illuminated by the light emitted from the lighting device 130 arranged at the lower end of the light guide panel 150, and may transmit the light forward. In other words, the light guide panel 150 may diffuse the light of the light sources 135, and may transmit the light to the second plate module B arranged in front of the light guide panel 150.

The light guide panel 150 may be made of a transparent or translucent polymer material such as acryl. As shown in FIG. 19, in the embodiment, the light guide panel 150 may be arranged above the light sources 135, and in the embodiment, the light guide panel 150 may be spaced apart from an upper surface of the light sources 135 so that a heat emission space S may be formed between the light guide panel 150 and the light sources 135. The heat of the light sources 135 may be emitted to the outside space through the heat emission space S. On the other hand, the light guide panel 150 may be in close contact with the upper portion of the light sources 135.

Then, the reflection panel 160 may be provided at the rear surface of the light guide panel 150. The reflection panel 160 may reflect the light diffused along the light guide panel 150 so that the light may face the front panel 170, and the reflection panel 160 may be stacked on the entire rear surface of the light guide panel 150. The reflection panel 160 may be a separate object, but may be formed by being coated, deposited, and attaching a film on the rear surface of the light guide panel 150. Previously, the light guide panel 150 and the reflection panel 160 were combined to be defined as the first plate module A.

Herein, the light guide panel 150 may have a rectangular plate shape, and may be formed somewhat smaller than the size of the front panel 170. Then, the light guide panel 150 may be supported by the back cover 140 from the front side thereof, and the lower frame 115, the upper frame 120, and the side frames 125 may surround the light guide panel 150.

As shown in FIG. 17, in the embodiment, the lower end of the light guide panel 150, the lower end being closer to the lighting device 130, may have the height equal to or similar to the height of a lower edge surface 170a of the front panel 170. This structure may be to form the height of the light sources 135 equal to or similar to the height of the lower edge surface 170a of the front panel 170, and the detailed structure will be described below again. On the other hand, an upper end of the light guide panel 150 without the lighting device 130 may have the height lower than an upper edge surface 170a of the front panel 170. The upper end of the light guide panel 150 may be surrounded by the upper frame 120, so that the upper end of the light guide panel 150 may be located lower than the upper edge surface 170a of the front panel 170 by at least the thickness of the upper connection portion 121c of the upper frame 120. Therefore, the upper end of the light guide panel 150 may be located lower than the upper edge surface 170a of the front panel 170.

Next, when showing the second plate module B, the second plate module B may include both the front panel 170 and the diffusion plate 180. The front panel 170 may be arranged at the foremost portion in the lighting panel 100 to form the front surface of the lighting panel 100, and be a portion directly observed by the user. The front panel 170 may have various colors and different brightness levels by controlling the lighting device 130.

The diffusion plate 180 may be arranged at the rear surface of the front panel 170 to allow the light to be uniformly transmitted to the front panel 170. In other words, the diffusion plate 180 may uniformly diffuse the light while being illuminated itself, and transmit the diffused light to the front panel 170 to allow the front panel 170 to be also uniformly illuminated over the entire area thereof.

First, when showing the front panel 170, the front panel 170 may have a rectangular plate shape, and be made of a material capable of transmitting light. For example, the front panel 170 may be made of glass or transparent plastic material, and otherwise, may be made of other materials capable of transmitting light. Then, the front panel 170 may be referred to as a transparent plate or a light emission plate.

The front panel 170 may be formed to be formed transparent so that light penetrating through the light guide panel 150 and reflected from the diffusion plate 180 may be transmitted through the front panel 170. Herein, "transparent" may mean a degree to which light may be transmitted. Then, the front panel 170 may have a color as necessary. For example, the front panel 170 may have a specific color such as white. Furthermore, the front panel 170 may be printed, on a surface thereof, with a specific figure or pattern, and a film printed with a specific figure or pattern may be attached, coated, or deposited on the front panel 170. As described above, when the front panel 170 is not completely transparent but translucent, the parts, such as the lighting device 130, etc., embedded in the lighting panel 100 may be prevented from being exposed to the user.

Figure 29:
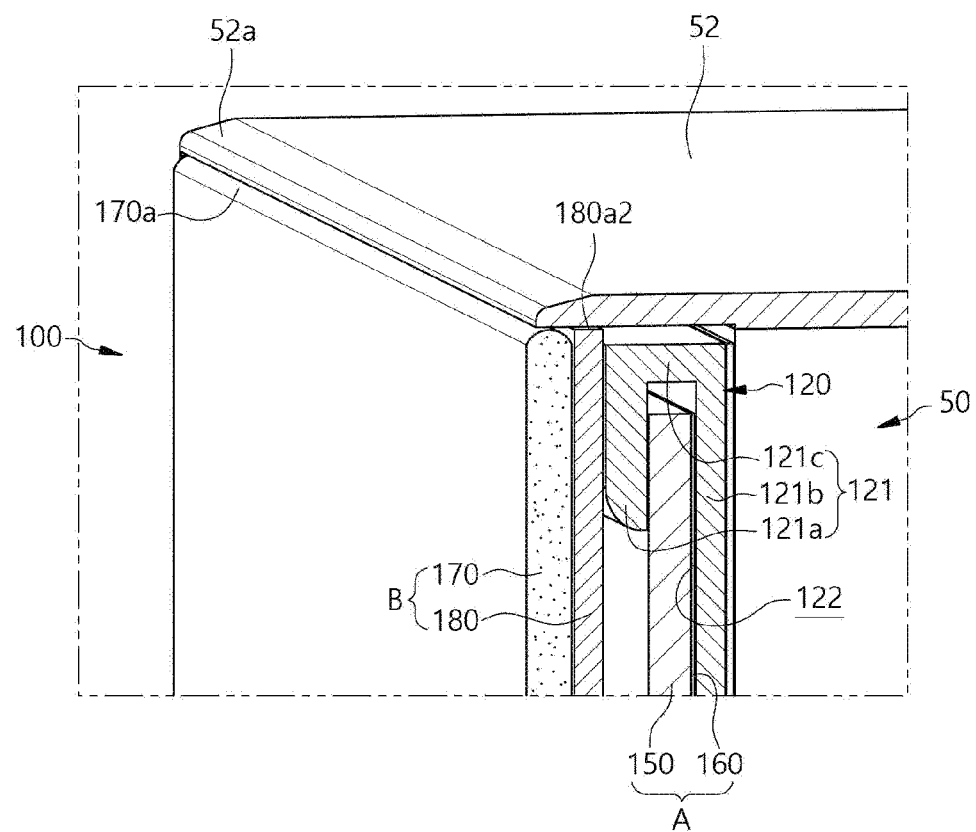
FIG. 29 is a sectional view showing an upper structure of the lighting panel of the door assembly according to a seventh embodiment of the present disclosure.

The front panel 170 may be made of a translucent material. Herein, "translucent" may mean a degree to which at least some of light of the light sources 135 may be transmitted to the front side. In the embodiment, the front panel 170 may be made of white that may transmit light. Then, a diffusing agent may be added to the front panel 170 so that the light incident on the front panel 170 may be diffused, or a pattern for diffusing the light may be formed on the front panel 170. In FIG. 29, the front panel 170 is expressed as being made of a milk-white translucent material.

The front surface and the rear surface of the front panel 170 may include flat portions, and a round portion may be formed in the edge surface 170a of the front panel 170. As shown in FIGS. 18, 19, and 22, the front panel 170 basically has a flat surface, and the round portion is formed at each edge of the front panel 170. The round portion may be the edge surface 170a of the front panel 170 formed into a curved surface, and round portions may be respectively formed on all the edge surface 170a of the front panel 170.

When showing a method of the front panel 170 emitting light, light diffused by the light guide panel 150 may be transmitted to the front panel 170 through the diffusion plate 180 located in front of the light guide panel 150. However, light of the light sources 135 may be transmitted through the lower frame 115 and be transmitted to the diffusion plate 180 and the front panel 170. As described above, the lower frame 115 may be made of a transparent or translucent material, and thus may transmit the light of the light sources 135.

Furthermore, both the upper frame 120 and the side frames 125 constituting the panel frame 110 may also be made of a transparent or translucent material. Therefore, even when the panel frame 110 surrounds the edges of the light guide panel 150, light emitted from the edges of the light guide panel 150 may pass through the upper frame 120 and the side frames 125 and be transmitted to the diffusion plate 180.

The diffusion plate 180 may be arranged at the rear surface of the front panel 170. In the embodiment, a front surface of the diffusion plate 180 may be in close contact with the rear surface of the front panel 170 without a gap. Therefore, light of the diffusion plate 180 may be intactly transmitted to the front panel 170.

As described below, an adhesive tape or an adhesive may be provided between the diffusion plate 180 and the front panel 170, but the adhesive tape or an adhesive is thinner in comparison to both the diffusion plate 180 and the front panel 170, so that the diffusion plate 180 and the front panel 170 may be consecutively arranged with each other. Furthermore, the adhesive tape or the adhesive may constitute a part of the diffusion plate 180 or the front panel 170.

Furthermore, since the entire rear surface of the front panel 170 is in close contact with the diffusion plate 180, the front panel 170 may not be directly fixed to the panel frame 110 and may be fixed to the panel frame 110 with the diffusion plate 180 as a medium. Therefore, there is no need to adhere the adhesive tape or the adhesive to fix the front panel 170 to the panel frame 110 along the edge of the front panel 170, and when the front panel 170 emits light, shading due to the adhesive tape, etc. may not be generated.

A transparent double-sided adhesive film (not shown) may be attached to the entire rear surface of the front panel 170, and the rear surface of the front panel 170 and the front surface of the diffusion plate 180 may be attached to each other without bubbles by the double-sided adhesive film. Therefore, the diffusion plate 180 may be referred to as a kind of a laminating paper.

Then, the diffusion plate 180 may be attached to the panel frame 110, and may be fixed to the front panel 170 without a separate coupling tool. Then, the panel frame 110 may not be necessary to surround and fix the edge surface 170a of the front panel 170, and only a minimum bezel may exist on the lighting panel 100 and the wide area of the front panel 170 may be exposed forward. In the embodiment, the shield end 73 of the frame cover 70 described above may be referred to correspond to the bezel.

The diffusion plate 180 may be made of a thin and light-transmitting material. In the embodiment, the diffusion plate 180 may be made of a synthetic resin material, and have a milk white color, thereby naturally and smoothly diffusing light. A transparent double-sided adhesive tape (not shown) is attached to an edge of a rear surface of the diffusion plate 180, and the diffusion plate 180 may be fixed to a front surface of the panel frame 110. Otherwise, the diffusion plate 180 may be directly coupled to the light guide panel 150, not the panel frame 110.

The diffusion plate 180 may protrude more than the light guide panel 150 in a direction of increasing the area of the lighting panel 100. As shown in FIG. 17, the lower end 180a1 of the diffusion plate 180 may extend downward more than the lower end of the light guide panel 150, and an upper end of the diffusion plate 180 may extend upward more than the upper end of the light guide panel 150. Furthermore, as shown in FIG. 22, it may be shown that a right end of the diffusion plate 180 may extend rightward more than a right end of the light guide panel 150. In other words, the diffusion plate 180 may be considered to have the area wider than the area of the light guide panel 150.

As described above, the diffusion plate 180 extends outward more than the light guide panel 150, so that the diffusion plate 180 may more uniformly transmit light to the front panel 170. The light of the light guide panel 150 may be diffused on the entire diffusion plate 180 once again, and then be transmitted to the front panel 170. Therefore, the area of the front panel 170 may be less than the area of the diffusion plate 180, and be formed greater than the area of the light guide panel 150. Referring to FIG. 20, it is shown that the height H3 of the lower end 180a1 of the diffusion plate 180 is lower than the height H2 of the lower end of the light guide panel 150.

In the embodiment, a diffusion space may be formed between the diffusion plate 180 and the light guide panel 150. The diffusion space may be a spacing with which the diffusion plate 180 may be spaced apart from the light guide panel 150. The diffusion space may serve to allow the light of the light guide panel 150 to be further diffused in a process of being transmitted to the diffusion plate 180. The lower front surface portion 116a, the upper front surface portion 121a, and the side front surface portion 126a are respectively arranged between the diffusion plate 180 and the light guide panel 150, so that the diffusion plate 180 and the light guide panel 150 may be freely spaced apart from each other.

The diffusion plate 180 may be exposed outward more than the front panel 170. In other words, when the diffusion plate 180 is attached to the front panel 170, the entire rear surface of the front panel 170 may be overlapped with the front surface of the diffusion plate 180. The light diffused from the entire diffusion plate 180 may be uniformly transmitted to the entire front panel 170, and a dead space to which light may be not transmitted may be prevented from being generated.

As shown in FIG. 17, in the embodiment, the diffusion plate 180 may extend outward more than the front panel 170 at the lower portion of the lighting panel 100 with the lighting device 130, but may extend approximately equal to the front panel 170 at the upper portion of the lighting panel 100 and opposite side portions of the lighting panel 100 (referring to FIG. 22). A location close to the light sources 135 may be a location with the greatest amount of light of the light sources 135, and the amount of light may be easily distorted such that the light is focused on the lower edge surface 170a of the front panel 170. Therefore, at the lower portion of the lighting panel 100, the lower portion being close to the light sources 135, the diffusion plate 180 may be preferably wider than the front panel 170.

As described above, the diffusion plate 180 diffuses light of the light guide panel 150 once and makes the light uniform, so that the entire region of the front panel 170 may uniformly emit light. Furthermore, the diffusion plate 180 is made of translucent material such as a milky-white color material, etc., thereby serving to block the structure of the panel frame 110 from being exposed to the user.

TABLE 1

|  | Brightness difference between maximum point and minimum point (nits) | Brightness difference between upper portion and lower portion of the front panel 170 (nits) | region deviated from reference value (number) |
|---|---|---|---|
| comparative example | 9.8 | 7.4 | 3.8 |
| embodiment | 2.4 | 1.9 | 0.7 |

The above table 1 indicates the brightness uniformity of the front panel 170 in response to whether the diffusion plate

180 is provided or not. First, the comparative example means a structure where the diffusion plate 180 is omitted and the light guide panel 150 is arranged directly behind of the front panel 170, and the example means a structure where the diffusion plate 180 described above laminated on the front panel 170. Herein, brightness means luminance, and the unit is nits. First, a brightness difference between the maximum spot and the minimum spot means a difference between luminance in a brightest region on the front panel 170 and luminance in a darkest region thereon. In the embodiment, brightness was measured a total of 10 times in various environments, and the average value of the difference was calculated, and as a result, there is a difference of 9.8 nits in the comparative example, but there is a difference of only 2.4 nits in the example, and thus the front panel 170 could be realize uniform brightness.

Next, a difference in brightness between the upper portion and the lower portion of the front panel 170 means a different in brightness between the lower portion of the front panel 170 with the lighting device 130 located behind the lower portion and the upper portion without the lighting device 130. In the test, the brightness was measured a total of 10 times in various environments, and the average value of the difference was calculated. As a result, in the comparative example, the difference is of 7.4 nits, but in the embodiment, the difference is only 1.9 nits, so that it is confirmed that the front panel 170 can realize more uniform brightness.

Finally, the regions outside the reference value means points of the front panel 170, the points includes the brightness separated from the average brightness by a reference value (2 nits) more when the average brightness of regions excluding the brightest and darkest regions was measured. For reference, the test was performed after the front panel 170 was divided into total 28 regions (4 columns*7 rows). As a result, in the comparative example, on average, 3.8 regions had a difference greater than or equal to the reference value (2 nits), whereas, in the embodiment, only 0.7 regions had a difference greater than or equal to the reference value (2 nits). Therefore, in the embodiment, it can be seen that the front panel 170 can realize more uniform brightness.

As shown in FIG. 19, the diffusion strip 190 may be provided in front of the light guide panel 150. The diffusion strip 190 may be arranged at a location adjacent to one edge of the light guide panel 150 at which the lighting device 130 may be arranged. The diffusion strip 190 may have a thin strip structure extending in a long shape along the one edge of the light guide panel 150. The diffusion strip 190 may be made of a synthetic resin material as the diffusion plate 180, and of transparent or translucent material.

The diffusion strip 190 may prevent a hot spot occurring by the light sources 135 of the lighting device 130. In the lower portion of the lighting panel 100, the lower portion being adjacent to the light sources 135, a hot spot where the light of the light sources 135 appears brighter than other regions may be prone to occur, and the diffusion strip 190 may prevent the hot spot from occurring. More specifically, the diffusion strip 190 may be arranged in front of the light sources 135, and may diffuse the light of the light sources 135. Therefore, the diffusion strip 190 may be considered as a hot-stop prevention part.

In the embodiment, the diffusion strip 190 may be arranged between the light sources 135 and the lower front surface portion 116*a* of the lower frame 115. A first surface of the diffusion strip 190 may be in close contact with the lower front surface portion 116*a*, and a second surface thereof may be in close contact with the light guide panel 150. Accordingly, the diffusion strip 190 may prevent the lower front surface portion 116*a* and the light guide panel 150 from being spaced apart from each other and having a gap, thereby preventing the light from being excessively diffused in the empty space formed in front of the light sources 135.

Figure 23:
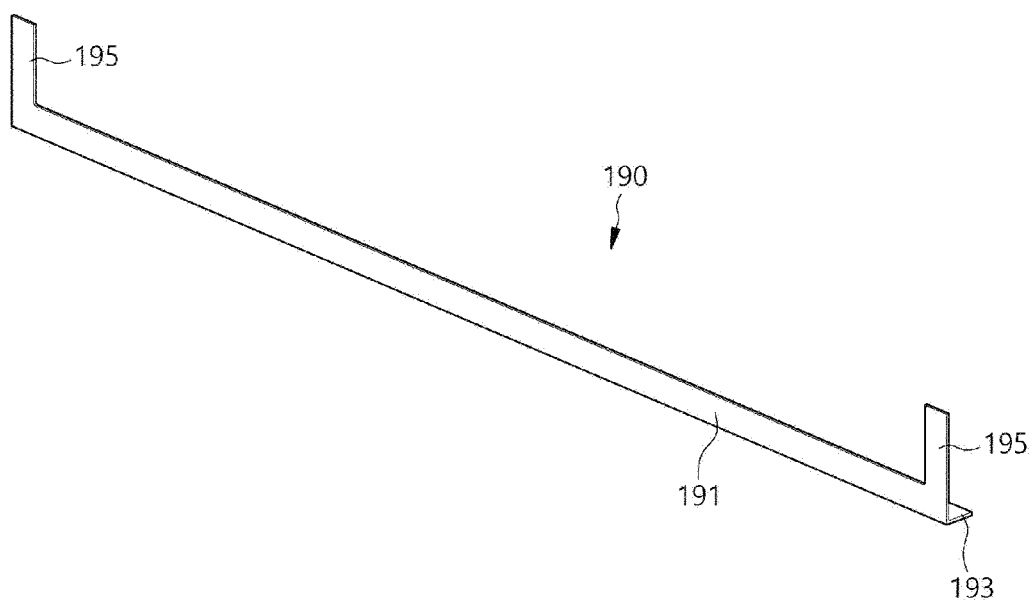
FIG. 23 is a perspective view showing a structure of a diffusion strip according to the embodiment of the present disclosure.

As shown in FIGS. 11 and 23, the diffusion strip 190 may include a strip body 191 extended along the lower portion of the light guide panel 150, and a seated body 193 extended in a direction perpendicular to the strip body 191. The strip body 191 may be a part arranged between the light guide panel 150 and the lower front surface portion 116*a* of the lower frame 115, and has a flat plate shape. The seated body 193 may be a part extended in the perpendicular direction to the strip body 191 and seated on the upper portion of the lighting device 130.

The diffusion strip 190 may be formed transversally longer than or equal to the light guide panel 150. When the diffusion strip 190 is formed transversally longer than the light guide panel 150, the diffusion strip 190 may prevent the light from being focused on a side surface of the lower portion of the light guide panel 150. Since the lower portion of the light guide panel 150 may be located close to the light sources 135, the lower portion may be relatively brighter than other regions, and the diffusion strip 190 may diffuse and block the light.

Strip extension parts 195 may be provided at opposite ends of the strip body 191. The strip extension parts 195 may be extended upward from the opposite ends of the diffusion strip 190, that is, in a direction in which a vertical height of the diffusion strip 190 may increase. In the embodiment, the strip extension parts 195 may be extended in a direction toward the upper frame 120. The strip extension parts 195 may allow the light of the light sources 135 to be relatively brighter at opposite ends of the lighting device 130 to prevent the hot spot from occurring. The strip extension parts 195 may vertically diffuse the hot spot occurring at the opposite ends of the lighting device 130.

The strip extension parts 195 may overlap with opposite ends of the light guide panel 150. The strip extension parts 195 may be prevented from deviating outward from the opposite ends of the light guide panel 150, and may at least partially overlap with the opposite ends of the light guide panel 150. Therefore, the strip extension parts 195 may disperse relatively brighter regions to the opposite ends of the light guide panel 150, thereby transmitting the light to the front panel 170.

The strip extension parts 195 may be surrounded by the guide fences 117*a* of the lower frame 115. The entire length of the diffusion strip 190 may be equal to or shorter than the length of the lower mounting groove 118 of the lower frame 115, so that the diffusion strip 190 may be stored inside the lower mounting groove 118, and thus the strip extension parts 195 may be located at opposite ends of the lower mounting groove 118 to be surrounded by the guide fences 117*a*.

Referring to FIG. 19, the seated body 193 and the strip body 191 may form a rough "¬" shape together. A light source hole 196 may be formed by penetrating through the seated body 193. The light source hole 196 may be an empty space in which the light sources 135 of the lighting device 130 may be arranged. When the diffusion strip 190 is seated in the upper portion of the lighting device 130, the light sources 135 may be exposed through the light source hole 196 of the seated body 193. Upper surfaces 135*a* of the light sources 135 exposed through the light source hole 196 may face the lower end of the light guide panel 150.

As shown in FIG. 20, an upper end of the strip body 191 may have the height H1 equal to an upper end of the lower front surface portion 116*a* of the lower frame 115. More specifically, the upper end of the strip body 191 may have a curved surface or an inclined surface, not an angled corner, and may be connected to the diffusion end 116*a*' of the lower frame 115. In the embodiment, the upper end of the strip body 191 may have a strip diffusion surface 191' forming a curved surface connected to the diffusion end 116*a*' of the lower frame 115. The strip diffusion surface 191' may serve to diffuse the light of the light sources 135 together with the diffusion end 116*a*'.

TABLE 2

| | Brightness difference between upper portion and lower portion of the front panel 170 (nits) | Region deviated from reference value (number) |
|---|---|---|
| comparative example | 8.3 | 1.8 |
| embodiment | 1.5 | 0.3 |

Table 2 indicates the brightness uniformity of the front panel 170 in response to whether the diffusion strip 190 is provided or not. The comparative example has a structure in which the diffusion plate 180 is installed but the diffusion strip 190 is omitted, and the example has the structure in which the diffusion strip 190 is arranged in front of the lighting device 130 together with the described-above diffusion plate 180. Herein, brightness means luminance, and unit is nits. First, the brightness difference between the upper portion and the lower portion of the front panel 170 means the brightness difference between the lower portion of the front panel, at which the lighting device 130 may be arranged in rear thereof and the diffusion strip 190 may be provided in front of the lighting device 130, and the upper portion of the front panel 170 without the lighting device 130 behind thereof. In the test, the brightness was measured a total of 10 times in various environments, and the average value of the difference was calculated. As a result, in the comparative example, the difference is of 8.3 nits, but in the embodiment, the difference is only 1.5 nits, so that it is confirmed that the front panel 170 can realize more uniform brightness.

Secondarily, a region outside the reference value means a lower point of the front panel 170 with the brightness separated from the luminance average value of the front panel 170 by the reference value (2 nits) or more. For reference, the test was performed after the lower portion of the front panel 170 was divided into total 8 regions (4 columns*2 rows). As a result, in the comparative example, on average, 1.8 regions had a difference greater than or equal to the reference value (2 nits), whereas, in the embodiment, only 0.3 regions had a difference greater than or equal to the reference value (2 nits). Therefore, in the embodiment, it can be seen that the front panel 170 can realize more uniform brightness.

Meanwhile, as shown in FIG. 20, the height between the upper end of the light sources 135 and the lower edge surface 170*a* of the front panel 170 indicates as H2. With the height relation in a boundary point 170*a*' between the upper surfaces 135*a* of the light sources 135 and the flat portion and the round portion that are included in the front panel 170, in the embodiment, the height of the boundary point 170*a*' and the upper surfaces 135*a* of the light sources 135 may be formed equal to each other. Herein, the boundary point 170*a*' may be formed at an edge portion of the front panel 170, and may be referred to as a point where the flat portion and the round portion that may be constitute the front panel 170 may be divided. In other words, the boundary point 170*a*' may be located at a region where the lower front surface portion 116*a* and the diffusion strip 190 may overlap with each other.

Preferably, the boundary point 170*a*' between the flat portion and the round portion may be located within a range α between upward 5 degrees and downward 5 degrees from the upper surfaces 135*a* of the light sources 135. When the boundary point 170*a*' is located within the range α upward 5 degrees and downward 5 degrees from the upper surfaces 135*a* of the light sources 135, the hot spot occurring due to the light of the light sources 135 in the lower portion of the front panel 170 may be reduced or eliminated. (i) When the boundary point 170*a*' is arranged under the upper surfaces 135*a* of the light sources 135 by more than a predetermined reference, the hot stop due to the light sources 135 may be directly exposed to the lower portion of the front panel 170, (ii) when the boundary point 170*a*' is arranged above the upper surfaces 135*a* of the light sources by more than a predetermined reference, shading may be generated along the lower edge surface 170*a* of the front panel 170, the lower edge surface 170*a* moving away from the light sources 135. Furthermore, the lighting device 130 may be located at a relatively lower portion, and a lower bezel of the panel frame 110 may increase in size, thereby deteriorating the sense of beauty of the lighting panel 100.

Figure 39:
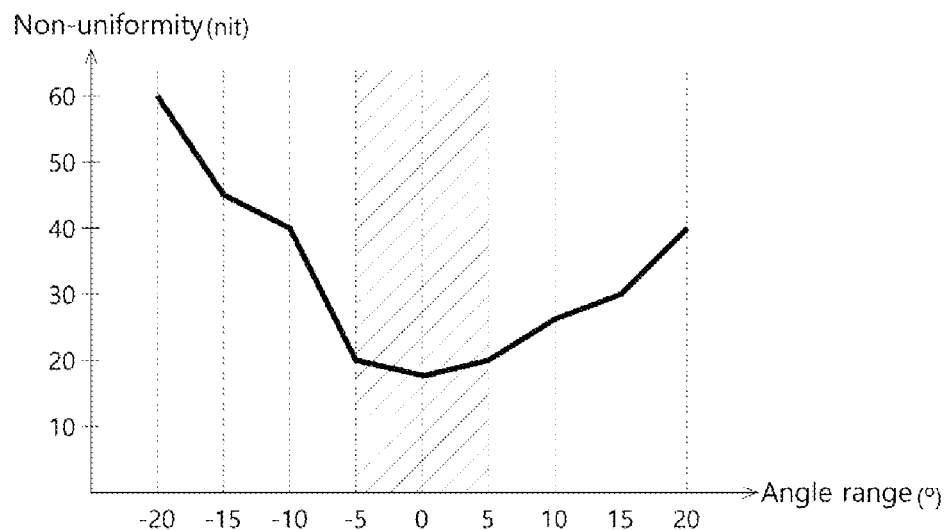
FIG. 39 is a graph showing brightness non-uniformity of the front panel with respect to a relative angle between a light source and an edge part of a front panel according to the embodiment of the present disclosure.

As shown in FIG. 39, the view shows a graph showing brightness non-uniformity of the front panel 170 with respect to a relative angle between the light sources 135 and the edge portion of the front panel 170 according to the embodiment. In this test, the lower portion of the front panel 170 was divided into total 8 regions (2 row*4 column), and a difference between the average brightness of the entire front panel 170 and each region was calculated. In the graph, X-axis may mean a relative angle between the boundary point 170*a*' and the upper surfaces 135*a* of the light sources 135, and Y-axis may mean a sum of the average brightness of the entire front panel 170 and the brightness difference of the regions of the lower portion of the front panel 170.

In the graph, when the boundary point 170*a*' is located within the range α between upward 5 degrees and downward 5 degrees from the upper surfaces 135*a* of the light sources 135, it is confirmed that the non-uniformity of the lower portion of the front panel 170 is relatively greatly reduced. This difference may be caused such that hot spot or shading due to the light sources 135 is reduced when the boundary point 170*a*' and the upper surfaces 135*a* of the light sources 135 are arranged with a proper angle therebetween.

Furthermore, the upper surfaces 135*a* of the light sources 135 may be located in a region where the lower front surface portion 116*a* and the diffusion strip 190 may overlap with each other. As shown in FIG. 20, it may be shown that the height of the upper surfaces 135*a* of the light sources 135 is located in a region where the lower front surface portion 116*a* and the diffusion strip 190 may overlap with each other. Accordingly, at the lower portion of the front panel 170 adjacent to the lighting device 130, the lower front surface portion 116*a* and the diffusion strip 190 may diffuse the light of the light sources 135 doubly.

Herein, the lower front surface portion 116*a* and the diffusion strip 190 may have different transmittances. Herein, the transmittance may be visible light transmittance to transmit the light of the light sources 135, and may mean the degree of transmitting the light of the light sources 135 to the front panel 170. The diffusion strip 190 may have a different transmittance of light depending on the type, number, arrangement, etc. of the light sources 135, so that light may be diffused more effectively.

Figure 40:
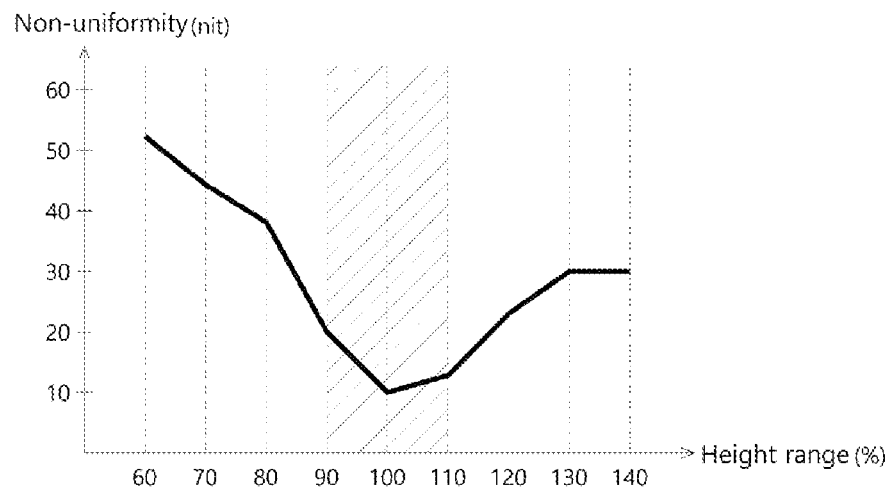
FIG. 40 is a graph showing brightness non-uniformity of the front panel with respect to a relative height of a panel frame and the diffusion strip according to the embodiment of the present disclosure.

Then, as shown in FIG. 40, according to the embodiment, brightness non-uniformity of the lower portion of the front panel 170 in response to a relative height between the lower front surface portion 116a and the diffusion strip 190 is shown. In this test, the lower portion of the front panel 170 was divided into total 8 regions (4 column*2 row), and a difference between the average brightness of the entire front panel 170 and each region was calculated. In the graph, X-axis may mean the relative height between the lower front surface portion 116a and the diffusion strip 190, and Y-axis may mean a sum of the average brightness of the entire front panel 170 and the brightness difference of the regions of the lower portion of the front panel 170.

As shown in the graph, when the height of the diffusion strip 190 is lower or higher than the height of the lower front surface portion 116a by 10%, it is confirmed that the non-uniformity of the lower portion of the front panel 170 is relatively greatly reduced. However, (i) when the height of the diffusion strip 190 is lower than the height of the lower front surface portion 116a by 10% or more, the diffusion strip 190 does not efficiently diffuse the light of the light sources 135 and transmit the light to the lower front surface portion 166a, and (i) when the height of the diffusion strip 190 is higher than the height of the lower front surface portion 116a by 10% or more, there is a problem in that the luminance is reduced even in the region separated from the lower front surface portion 116a where the light sources does not directly light up. However, as a result of the previous test, the uniform luminance value was obtained in the case where the height of the diffusion strip 190 is lower than the height of the lower front surface portion 116a, than the case where the height of the diffusion strip 190 is higher than the height of the lower front surface portion 116. In the embodiment, the height of the diffusion strip 190 may be formed equal to the height of the lower front surface portion 116a.

Figure 24:
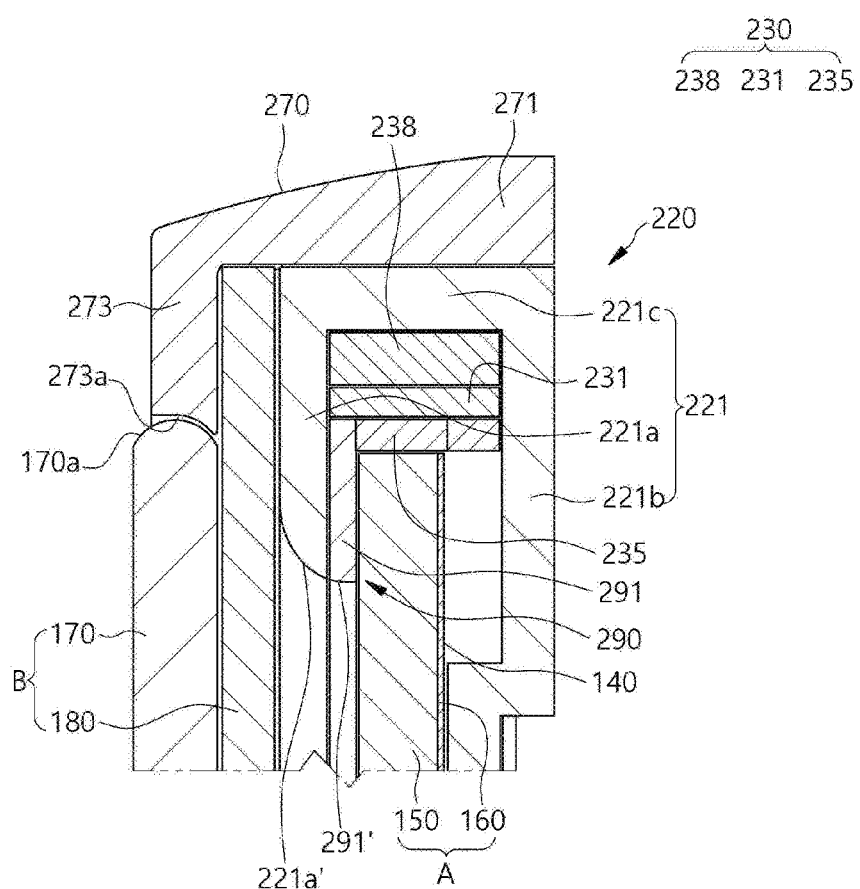
FIG. 24 is a sectional view showing an upper structure of the lighting panel of the door assembly according to a second embodiment of the present disclosure.

Meanwhile, according to a second embodiment as shown in FIG. 24, the lighting device 130, 230 may be arranged at not only the lower portion of the lighting panel 100, but also the upper portion of the lighting panel 100. The lighting device 130, 230 may be arranged at each of the lower portion and the upper portion of the lighting panel 100 so that the front panel 170 may be illuminated. Two lighting devices 130 may allow the front panel 170 with large area to entirely have uniform brightness. For example, shown in FIG. 24 an upper frame 220 and the lighting device 230 may be given with 200's reference numerals, and the structures thereof may be the same as the structures of the lower frame 115 and the lighting device 130, so the detailed descriptions thereof will be omitted.

Herein, the lighting device 230 may include the first lighting device 130 arranged in the lower frame 115 of the panel frame 110 and the second lighting device 230 arranged in the upper frame 220. Then, the first lighting device 130 and the second lighting device 230 may be controlled independently. When the first lighting device 130 and the second lighting device 230 are controlled independently, the front panel 170 may be realized with various shapes. The structure in which the second lighting device 230 may be arranged at the upper frame 120 may be equal to the structure in which the first lighting device 130 is arranged at the lower frame 115.

Figure 25:
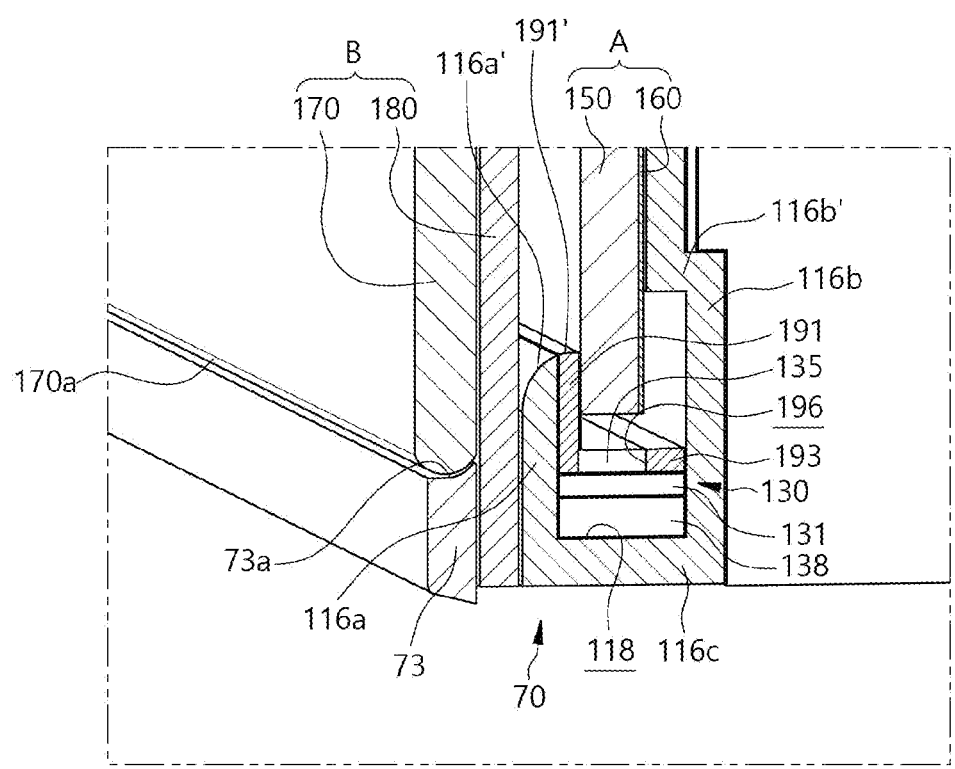
FIG. 25 is a sectional view showing a lower structure of the lighting panel of the door assembly according to a third embodiment of the present disclosure.

According to a third embodiment shown in FIG. 25, the frame cover 70 may be provided only in the shield end 73. In other words, the lower cover portion 71 connected to the lower plate 51 may be omitted in the frame cover 70.

The shield end 73 may support the lower edge surface 170a, i.e., an end portion of the front panel 170. At the same time, the shield end 73 may be coupled to the front surface of the diffusion plate 180. In other words, the shield end 73 may support the lower edge surface 170a of the front panel 170 while being coupled to the front surface of the diffusion plate 180.

Figure 26:
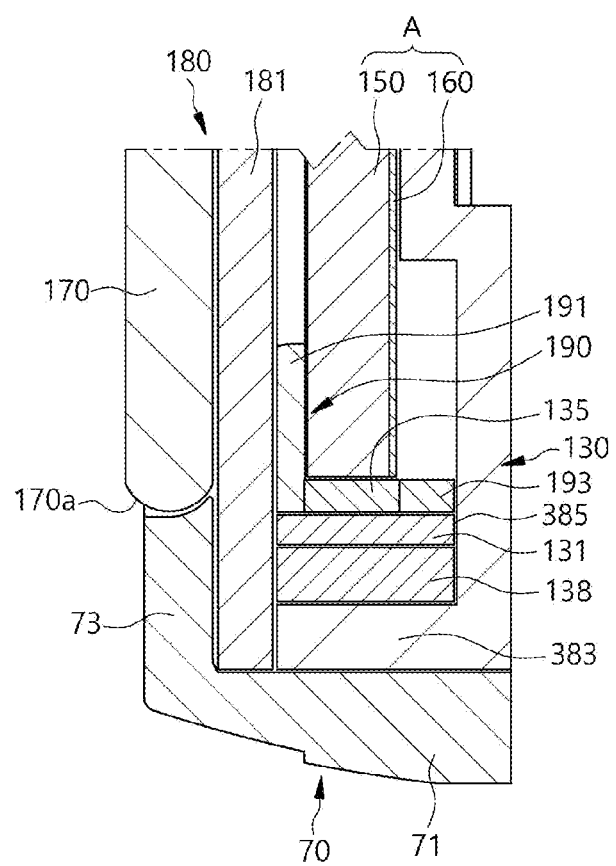
FIG. 26 is a sectional view showing a lower structure of the lighting panel of the door assembly according to a fourth embodiment of the present disclosure.

According to a fourth embodiment shown in FIG. 26, the lower front surface portion 116a may be omitted in a lower frame 315 constituting the panel frame 110. In other words, the lower frame 315 may include only a lower rear surface portion 316b and a lower connection portion 316c may be provided.

Therefore, a diffusion plate 180 arranged behind the front panel 170 may be in close contact with the diffusion strip 190 directly. In other words, the diffusion plate 180 and the light guide panel 150 may be arranged close to each other by a value of the emitted lower front surface portion 116a. Even when the lower front surface portion 116a is omitted, the light of the light guide panel 150 may be transmitted to the diffusion plate 180. Reference numeral 181 indicates a lower portion of the diffusion plate 180 arranged in front of the light guide panel 150.

Otherwise, the lower rear surface portion 116b and the lower connection portion 116c of the prior embodiment are also omitted, and the structure thereof may be provided in the diffusion plate 180. In other words, a panel connection portion (not shown) and a panel rear surface portion (not shown) may be provided in the diffusion panel 180, and the lighting device 130 and the lower end of the light guide panel 150 may be arranged in a space surrounded by the panel connection portion and the panel rear surface portion.

Figure 27:
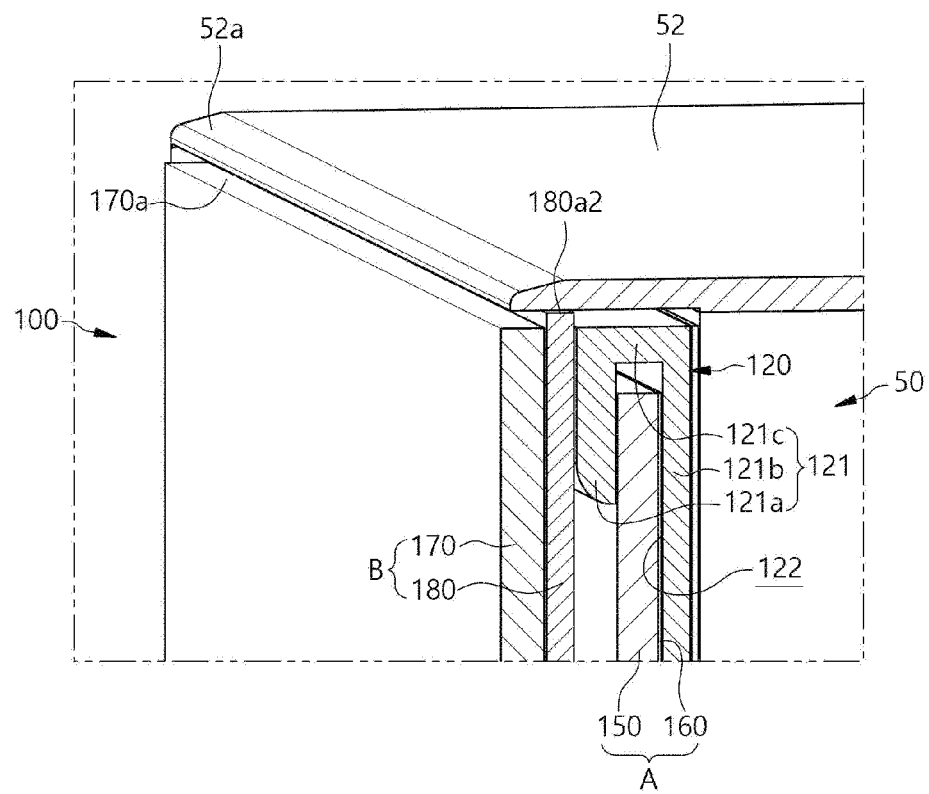
FIG. 27 is a sectional view showing an upper structure of the lighting panel of the door assembly according to a fifth embodiment of the present disclosure.

FIG. 27 is a view showing the upper structure of the lighting panel 100 constituting the door assembly according to a fifth embodiment of the present disclosure. As described above, the edge surface 170a of the front panel 170 may include a flat surface without a round portion. Herein, an upper edge surface 170a of the front panel 170 may be formed shorter than an upper end 180a2 of the diffusion plate 180. Therefore, the support area and the diffusion area by the diffusion plate 180 may be secured maximally wide.

Figure 28:
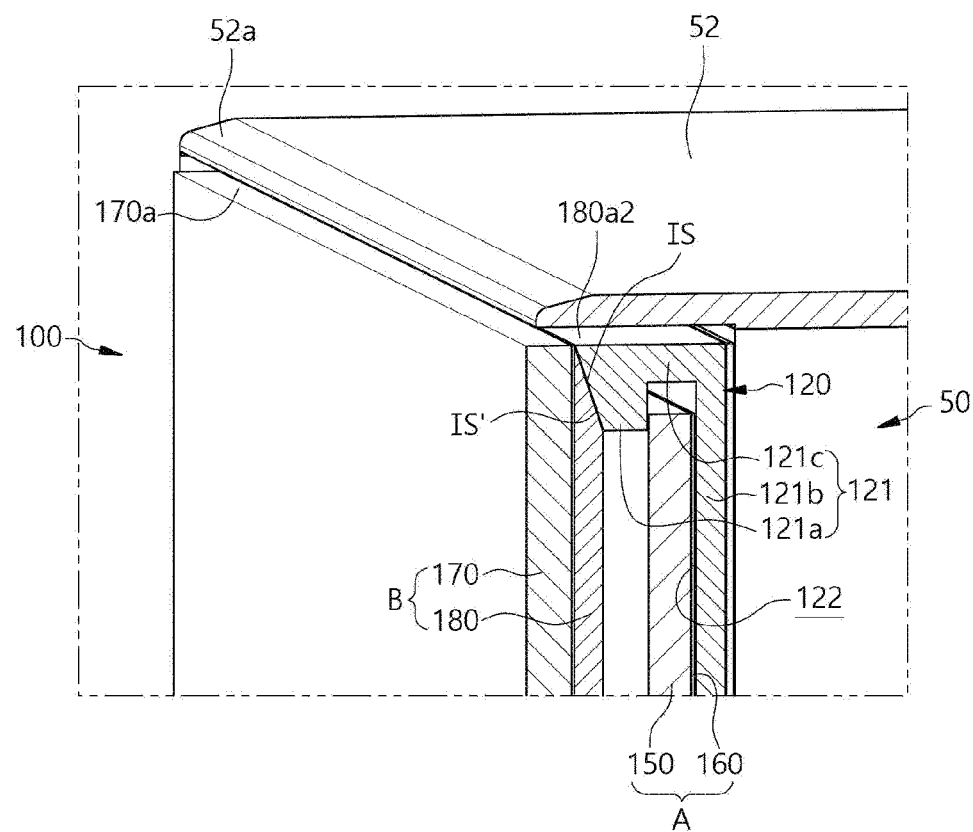
FIG. 28 is a sectional view showing an upper structure of the lighting panel of the door assembly according to a sixth embodiment of the present disclosure.

FIG. 28 is a view showing the upper structure of the lighting panel 100 of the door assembly according to a sixth embodiment of the present disclosure. As shown in the drawing, a first inclined surface IS may be formed on the rear surface of the diffusion plate 180, and a second inclined surface IS' may be formed on the upper front surface portion 121a facing the first inclined surface IS. The first inclined surface IS and the second inclined surface IS' may be in close contact with each other. The first inclined surface IS and the second inclined surface IS' may eliminate sharp edges so that the shading in the upper end of the front panel 170 may be reduced.

Figure 30:
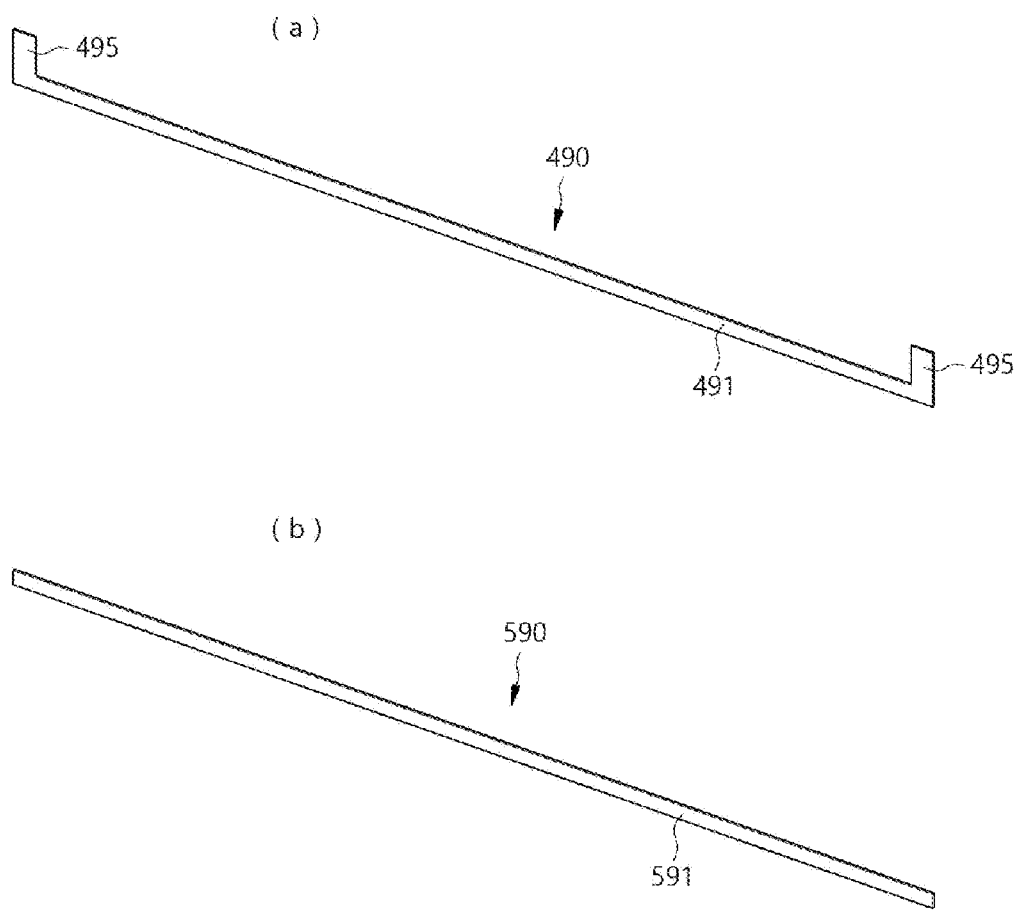
FIG. 30 is a perspective view showing the diffusion strip according to other embodiments of the present disclosure.
Figure 31:
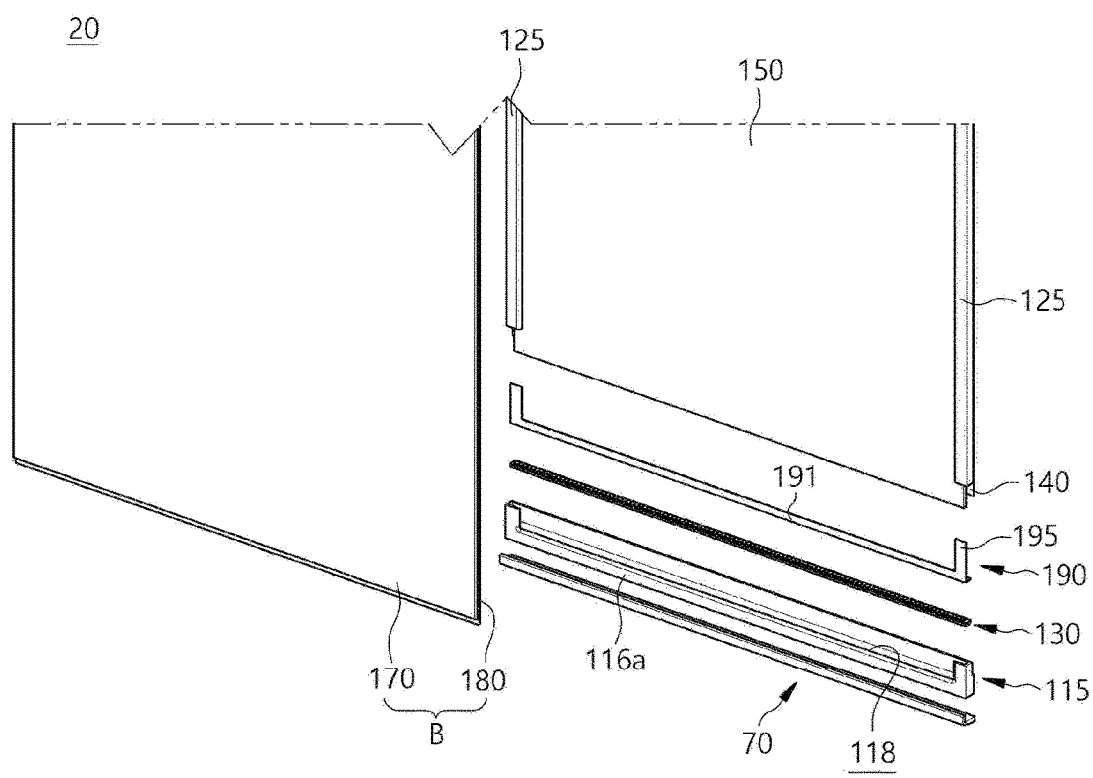
FIGS. 31 to 35 are views sequentially showing an assembly process of the door assembly according to the embodiment of the present disclosure.

FIGS. 30A and 30B are views showing the above-described diffusion strip 490 according to another embodiment. As shown in FIG. 30A, the diffusion strip 490 may include a strip body 491 and strip extension parts 495, the seated body 193 according to the prior embodiment may be omitted. In this case, the strip body 491 may be fixed while being fitted between the lower front surface portion 116a and the light guide panel 150.

Furthermore, as show in FIG. 30B, a diffusion strip 590 may include only a strip body 591. In other words, all the seated body 193 and the strip extension parts 195 according to the prior embodiment may be omitted. In this case, the strip body 591 may be fixed while being fitted between the lower front surface portion 116a and the light guide panel 150.

Next, an assembly process of the lighting panel 100 of the door assembly 20 according to the present disclosure will be described with reference to FIGS. 31 to 35. First, the second plate module B will be assembled. The second plate module B may be assembled as a transparent double-sided adhesive film (not shown) may be attached to the entire rear surface of the front panel 170, and the rear surface of the front panel 170 and the front surface of the diffusion plate 180 may be attached to each other without bobbles by the double-sided adhesive film. In other words, the diffusion plate 180 may be referred to as a kind of a laminating paper.

Separately, the lighting device 130 may be formed in the lower frame 115. The heat emission block 138 constituting the lighting device 130 may be arranged in the lower mounting groove 118 of the lower frame 115, and both the substrate 131 and the light sources 135 may be stacked thereon. Of course, after when the heat emission block 138, the substrate 131, and the light sources 135 are assembled first to each other, and the assembled part may be mounted to the lower mounting groove 118.

Figure 32:
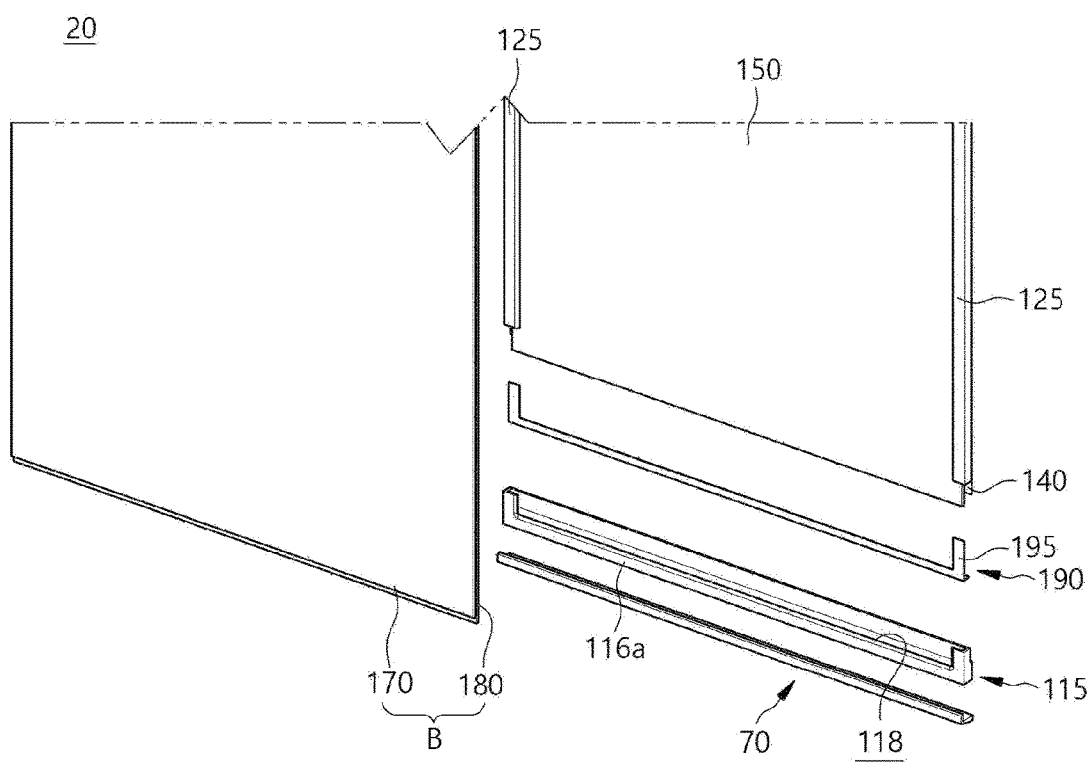

Then, the panel frame 110 may be assembled to the edges of the light guide panel 150. Among four edges of the light guide panel 150, the three edges excluding the lower end may be respectively surrounded by the upper frame 120 and the pair of side frames 125. The above state is shown in FIG. 32.

Then, the diffusion strip 190 may be arranged in the lower mounting groove 118. The diffusion strip 190 may be seated in the lower mounting groove 118 while being in close contact with the lower front surface portion 116a. In this process, the light sources 135 may be exposed while being fitted into the light source hole 196 (referring to FIG. 19) of the diffusion strip 190 from the lower side of the diffusion strip 190.

Figure 33:
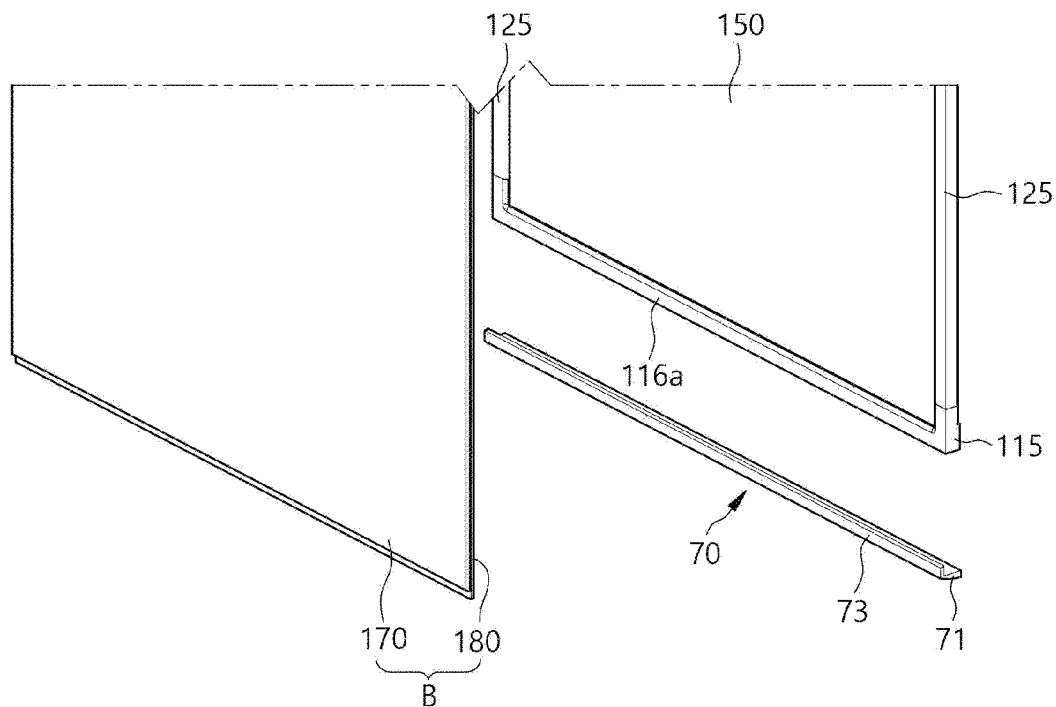

As described above, the lower frame 115 into which the lighting device 130 and the diffusion strip 190 may be fitted may be assembled to the light guide panel 150 to surround the lower end of the light guide panel 150. Herein, the lower frame 115 may be connected to the lower ends of the side frames 125. An adhesive or an adhesive tape may allow the lower frame 115 and the side frames 125 to be fixed to each other, and the side frames 125 and the upper frame 120 to be fixed to each other. The above structure is shown in FIG. 33.

Figure 34:
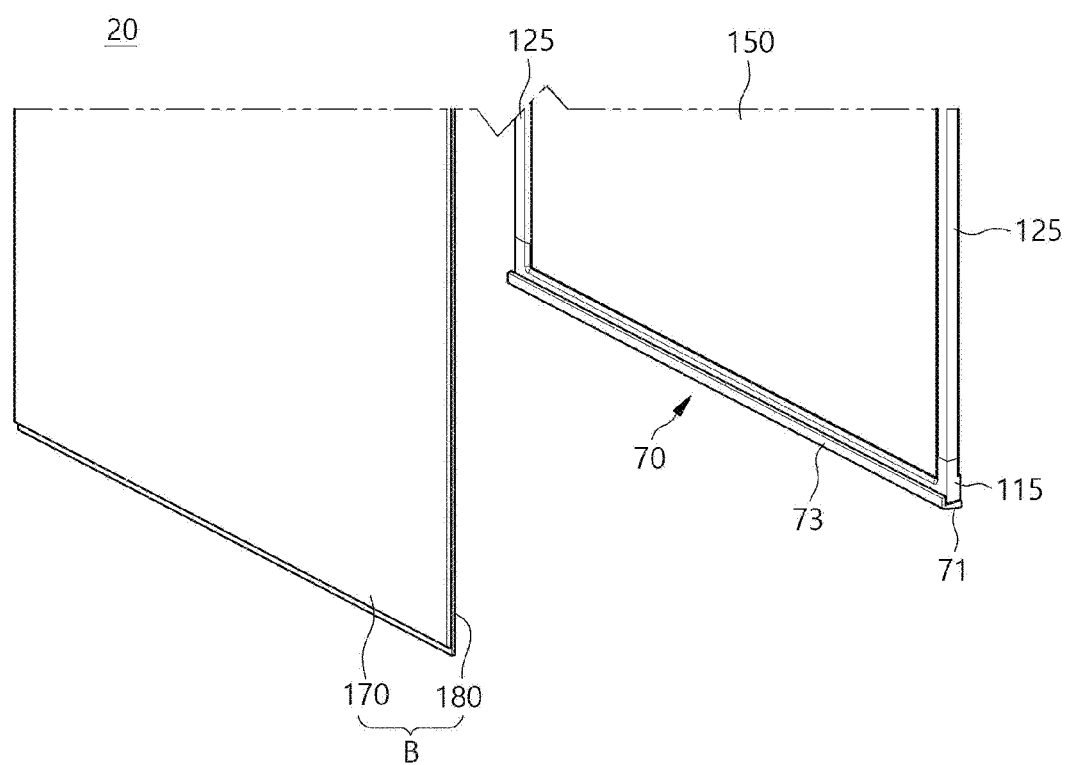

Then, the frame cover 70 may be assembled to the lower portion of the lower frame 115. The frame cover 70 may be coupled to the lower portion of the lower frame 115, and the lower cover portion 71 of the frame cover 70 may surround the lower portion of the lower frame 115. The frame cover 70 may be attached to the lower portion of the lower frame 115, and may be fixed by a coupling tool. Otherwise, when the frame cover 70 is integrally formed with the lower plate 51 of the door body 50, the lower frame 115 may be seated on the frame cover 70 without the separate attachment. The above structure is shown in FIG. 34.

Figure 35:
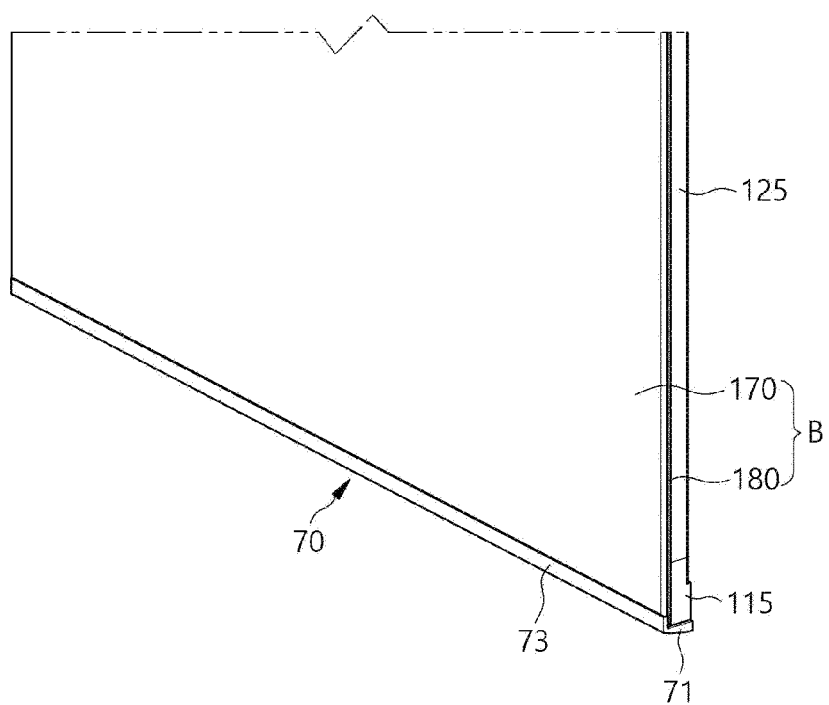

In this state, as show in FIG. 35, the second plate module B may be coupled to the front surface portion of the panel frame 110. In the second plate module B, the adhesive tape may be attached to the rear surface of the diffusion plate 180 or the front surface of the panel frame 110, and the diffusion plate 180 may be coupled to the panel frame 110 by being brought into close with each other. In the embodiment, the front panel 170 may not be directly fixed to the panel frame 110, and the diffusion plate 180 bonded to the rear surface of the front panel 170 may be fixed to the panel frame 110. Accordingly, the panel frame 110 does not block the edge surfaces 170a of the front panel 170, and the front panel 170 does not need to include an attaching portion to be attached to the panel frame 110, and thus the attaching portion may prevent the front panel 170 from being shaded.

Next, a process of turning on the lighting device 130 will be described. In a refrigerator according to an embodiment of the present disclosure, as the lighting device 130 is operated, the front surface of the door may light up. Then, the front surface of the door may light up with a specific color. The operation of the lighting device 130 may be performed by the user manipulating a control part (not shown). The control part may include a switch or a touch panel provided on one portion of the refrigerator.

The control part may be provided at an upper end of a front surface of the cabinet 10 or inside the storage space. The control part may be provided in any one of among the plurality of door assemblies 20 as necessary. Of course, the user can manipulate the control part to preset operation time and an operation condition of the lighting device 130, and a luminescent color of the light sources 135, etc. The control part may include a display capable of displaying information and being manipulated.

Then, the lighting device 130 may be manipulated and preset by a remote device separated from the refrigerator. The refrigerator may communicate with the remote device by a communication part connected to the control part, and the user can manipulate operation of the lighting device 130 by the remote device. The communication part may communicate with the remote device in various ways, and, may perform communication in various ways such as wired, wireless, and short-distance communication (Bluetooth, Wi-Fi, Zigbee, NFC, etc.). Herein, the lighting device 130 may be easily operated and set up with an application or dedicated program installed on a user's mobile phone.

Meanwhile, the lighting device 130 may be operated by a sensor (not shown). For example, the sensor may be a user detection sensor that may detect proximity of the user. In other words, the user detection sensor may be various devices, such as an infrared sensor, an ultrasonic sensor, a laser sensor, etc., which may detect that the user is approaching near the refrigerator.

Therefore, when the user comes close to the refrigerator by a preset distance for use of the refrigerator, the user detection sensor may detect the movement and transmit a signal to the control part and may turn on the lighting device 130. Then, when the user moves away from the refrigerator, the user detection sensor may detect the movement and transmit a signal to the control part and may turn off the lighting device 130.

Figure 36:
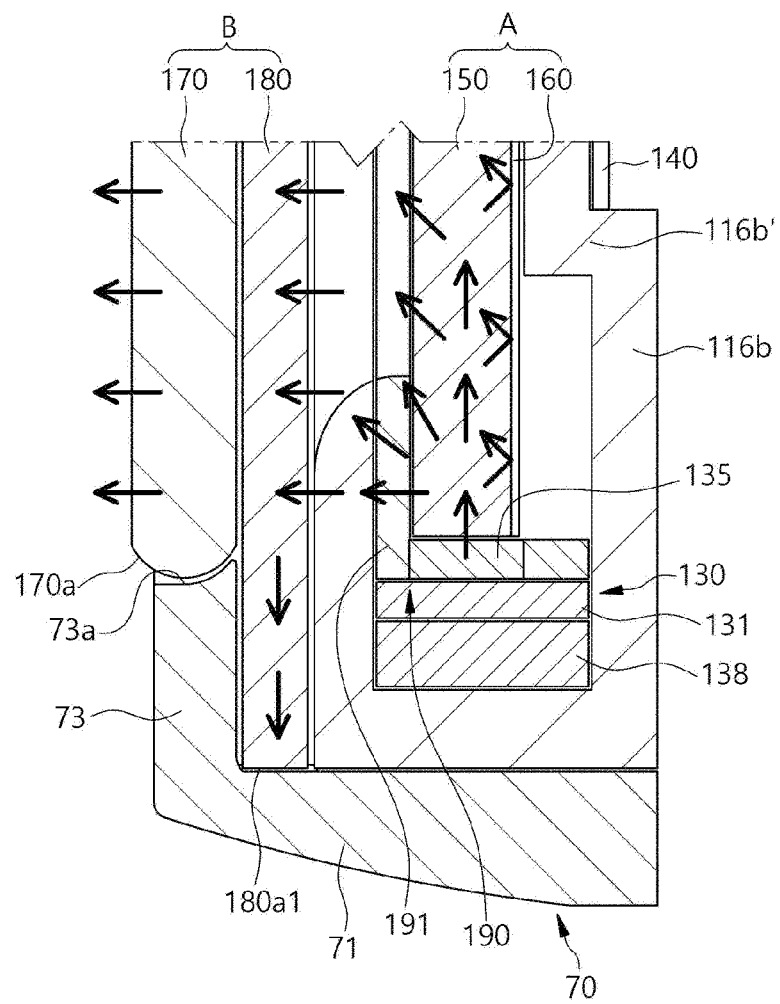
FIG. 36 is a concept view showing a process in which light of the lighting device is transmitted to a front panel in the door assembly according to the embodiment of the present disclosure.

Referring to FIG. 36, when the lighting device 130 is turned on, the light emitted from the light sources 135 may be directed to the lower end of the light guide panel 150, and the light may be diffused and reflected along the light guide panel 150. Then, the light guided by the light guide panel 150 may be reflected forward by the reflection panel 160 so that the light may be diffused by the diffusion plate 180 once more.

As described above, the lighting device 130 may emit light in the direction toward the light guide panel 150 so that the light guide panel 150 may transmit light to the second plate module B, and the lighting device 130 may directly emit light to the second plate module B through the transparent lower frame 115. Furthermore, since light may be transmitted through all the lower frame 115, the upper frame 120, and the side frames 125 that cover the diffusion panel 180, the panel frame 110 may prevent a dark region from being generated on corners of the front panel 170.

Specifically, the diffusion strip 190 arranged in front of the light sources 135 may reliably prevent the hot spot occurring due to the light sources 135. In the lower portion of the lighting panel 100, the lower portion being adjacent to the light sources 135, a hot spot where the light of the light sources 135 appears brighter than other regions may be prone to occur, and the diffusion strip 190 may prevent the hot spot from occurring. More specifically, the diffusion strip 190 may be arranged in front of the light sources 135, and may diffuse the light of the light sources 135.

As a result, the front panel 170 may be uniformly illuminated at the entire area thereof, and the front surface of the door assembly 20 may be illuminated with preset luminance or color.

Herein, the lower frame 115 may be transparent or translucent and transmit the light of the light sources 135, but the lower frame 115 may serve to prevent the parts such as the lighting device 130, etc. to be directly exposed to the user together with the diffusion strip 190. Furthermore, the shield end 73 of the frame cover 70 may be extended to the lower end of the front panel 170 to be arranged in front of the lighting device 130, so that the shield end 73 of the frame cover 70 may serve to block the lighting device 130, etc.

Then, when the user detection sensor detects that the user is close to the refrigerator in a state where the lighting device 130 is turned on and the front surface of the door assembly 20 be illuminated brightly, in order to prevent glare from the user, the lighting device 130 may be turned off or brightness thereof may be gradually reduced. Then, when the user moves away from the refrigerator, the lighting device 130 may be turned on or the reduced brightness thereof may be returned to the initial brightness. Herein, the sensor may be an illumination sensor.

Figure 37:
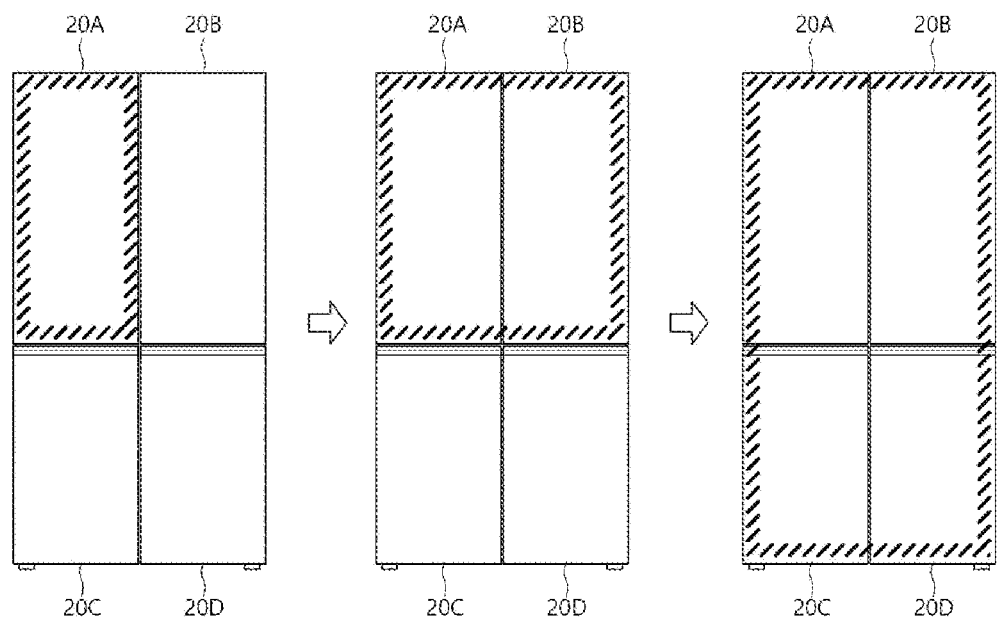
FIG. 37 is a front view showing different forms of which the front panel of the door assembly according to the present disclosure is illuminated.
Figure 38:
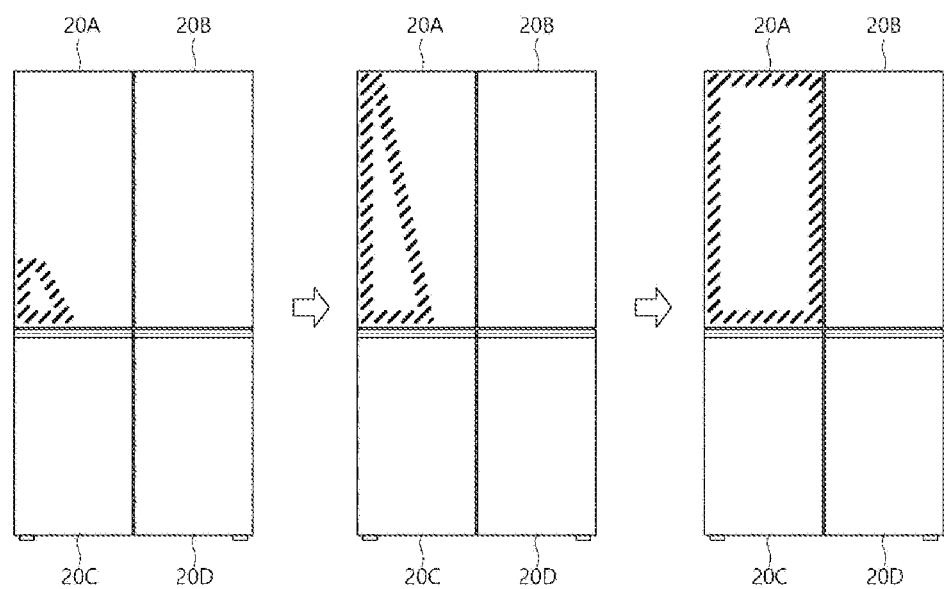
FIG. 38 is a front view showing a sequence of a process in which the front panel of the door assembly according to the present disclosure is illuminated sequentially.

FIGS. 37 and 38 are views showing various patterns of the front panel 170 illuminated. As shown in FIG. 37, the refrigerator may be operated such that some doors among the plurality of door assemblies 20 may be illuminated or illuminated with a specific color. In other words, not all lighting devices 130 provided in the door assemblies 20 are operated, but only some door assemblies 20 among the entire door assemblies 20 may be illuminated. For example, only the first refrigerator door 20A may be illuminated.

Herein, the sensor provided in the refrigerator may detect approach of the user, and the door assemblies 20 may be illuminated in order in response to the user movement. FIG. 37 is a view showing the door assemblies 20, the door assemblies 20 are illuminated in response to the user movement, in order of (i) the first refrigerator door 20A, (ii) the first refrigerator door 20A and the second refrigerator door 20B, (iii) the first refrigerator door 20A, the second refrigerator door 20B, the first freezer door 20C, and the second freezer door 20D.

Of course, the sensor does not determine that light is emitted from front surfaces of some of the plurality of door assemblies 20, and the refrigerator may be preset such that some of the plurality of door assemblies 20 may be illuminated by various conditions such as an operational state of the refrigerator, a setting of the user, etc.

FIG. 38 is a view showing that the lighting device 130 of one door assembly (the first refrigerator door 20A) is controlled to adjust brightness of the front panel 170. The entire lighting device 130 is not turned on or off, and some of the light sources 135 of the lighting device 130 may be turned on, or a large number of the light sources 135 may be turned on sequentially. In FIG. 38, it is shown that among the plurality of light sources 135, adjacent light sources 135 are turned on sequentially and a kind of gradation effect is implemented on the front panel 170.

Hereinabove, even though all components constituting the embodiment according to the present disclosure have been described as being combined or operated in combination as one, the present disclosure is not necessarily limited to the embodiment. Within the scope of the present disclosure, all the components may be operated by selectively combining one or more. Furthermore, it will be further understood that the terms "include", "comprise" "have", etc. described in this specification, should be interpreted as having the presence of the components unless the context clearly indicates otherwise, but other components are not excluded, and are further included. Unless otherwise defined, all terms which include technical and scientific terms, used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

What is claimed is:

1. A door assembly for an appliance, the door assembly comprising:
    a door body; and
    a lighting panel that is disposed at the door body and defines a front portion of the door assembly,
    wherein the lighting panel comprises:
        a panel frame,
        a lighting device disposed at the panel frame and configured to emit light,
        a light guide panel that faces the panel frame and has an edge that faces the lighting device,
        a front panel that defines a front surface of the lighting panel and is parallel to the light guide panel, and
        a diffusion panel disposed between the front panel and the light guide panel and configured to transmit light from the light guide panel toward the front panel,
    wherein the lighting panel further comprises a diffusion strip that is disposed forward relative to a light source of the lighting device, the diffusion strip being configured to transmit light emitted from the light source toward the front panel,
    wherein the panel frame includes a diffusion end that defines a first curved surface or a first inclined surface, the diffusion end being disposed at an edge of the panel frame that faces the front panel, and
    wherein the diffusion strip includes a strip diffusion surface that is disposed at an upper end of the diffusion strip and defines (i) a second curved surface extending to the first curved surface of the diffusion end or (ii) a second inclined surface extending to the first inclined surface of the diffusion end.

2. The door assembly of claim 1, wherein the diffusion panel has a first end portion that faces the lighting device and extends outward relative to an end of the front panel.

3. The door assembly of claim 1, wherein the diffusion end is disposed at the edge of the panel frame facing a rear surface of the diffusion panel, and wherein the diffusion end extends toward a center portion of the lighting panel such that the diffusion end is located closer to the center portion of the lighting panel than an edge surface of the front panel.

4. The door assembly of claim 1, wherein the panel frame surrounds edges of the light guide panel, and
wherein the diffusion panel is disposed at a front surface of the panel frame.

5. The door assembly of claim 1, wherein the panel frame includes a front surface portion that surrounds an edge portion of the light guide panel and is disposed between the diffusion panel and the light guide panel.

6. The door assembly of claim 1, wherein the light source is spaced apart from an edge surface of the light guide panel.

7. The door assembly of claim 1, wherein the diffusion panel and the light guide panel are spaced apart from each other to thereby define a diffusion space between the diffusion panel and the light guide panel.

8. The door assembly of claim 1, wherein a surface area of the front panel is less than a surface area of the diffusion panel and greater than a surface area of the light guide panel.

9. The door assembly of claim 1, wherein the front panel includes:
a front surface and a rear surface that are flat and parallel to each other; and
an edge surface that is round and disposed between the front surface of the front panel and the rear surface of the front panel,
wherein each of the front surface of the front panel and the rear surface of the front panel has a boundary point interfacing the edge surface of the front panel, the boundary point being defined at a position higher than or corresponding to an upper surface of the light source of the lighting device, and
wherein the position of the boundary point is located within an angular range defined between a first line extending upward by 5 degrees from the upper surface of the light source and a second line extending downward by 5 degrees from the upper surface of the light source.

10. The door assembly of claim 1, wherein the lighting panel further comprises a frame cover that is coupled to a lower portion of the panel frame and supports an edge surface of the front panel, and
wherein the lower portion of the panel frame surrounds the lighting device.

11. The door assembly of claim 10, wherein the frame cover includes a shield end that protrudes toward the edge surface of the front panel, and
wherein the front panel protrudes forward relative to a front surface of the shield end.

12. The door assembly of claim 1, wherein the panel frame comprises:
a lower frame that supports a lower portion of the light guide panel;
an upper frame that supports an upper portion of the light guide panel; and
a pair of side frames that respectively support side surfaces of the light guide panel and connect the lower frame to the upper frame,
wherein the lighting device is disposed at the lower frame, and
wherein the lighting panel further comprises a frame cover that covers a lower portion of the lower frame.

13. The door assembly of claim 1, wherein the diffusion strip is in contact with the light source and configured to transmit light emitted from the light source toward the front panel.

14. The door assembly of claim 13, wherein the panel frame is made of a material configured to transmit light, the panel frame including a front surface portion that faces the diffusion strip, and
wherein the front surface portion of the panel frame is disposed between the diffusion strip and the front panel, or the diffusion strip is disposed between the front surface portion of the panel frame and the light source.

15. The door assembly of claim 14, wherein the front surface portion of the panel frame extends upward from a lower portion of the panel frame, and
wherein a height of the diffusion strip is less than or equal to than a height of the front surface portion of the panel frame such that the front surface portion of the panel frame covers the diffusion strip.

16. The door assembly of claim 13, wherein the diffusion strip comprises strip extension parts that are disposed at opposite ends of the diffusion strip and extend in a vertical direction to thereby increase a vertical height of the diffusion strip.

17. The door assembly of claim 13, wherein the light source is disposed on an upper portion of the lighting device, and
wherein the diffusion strip comprises:
a strip body disposed at a front side of the light source; and
a seated body connected to the strip body and disposed on the upper portion of the lighting device.

18. A refrigerator comprising:
the door assembly of claim 1; and
a cabinet that is coupled to the door assembly and defines a storage space therein.

19. A door assembly for an appliance, the door assembly comprising:
a door body; and
a lighting panel that is disposed at the door body and defines a front portion of the door assembly,
wherein the lighting panel comprises:
a panel frame,
a lighting device disposed at the panel frame and configured to emit light,
a light guide panel that faces the panel frame and has an edge that faces the lighting device,
a front panel that defines a front surface of the lighting panel and is parallel to the light guide panel, and
a diffusion panel disposed between the front panel and the light guide panel and configured to transmit light from the light guide panel toward the front panel,
wherein the front panel includes:
a front surface and a rear surface that are flat and parallel to each other, and
an edge surface that is round and disposed between the front surface of the front panel and the rear surface of the front panel,
wherein each of the front surface of the front panel and the rear surface of the front panel has a boundary point interfacing the edge surface of the front panel, the boundary point being defined at a position higher than or corresponding to an upper surface of a light source of the lighting device, and wherein the position of the boundary point is located within an angular range defined between a first line extending upward by 5 degrees from the upper surface of the light source and a second line extending downward by 5 degrees from the upper surface of the light source.

* * * * *